(12) United States Patent
Ye et al.

(10) Patent No.: US 12,326,609 B2
(45) Date of Patent: Jun. 10, 2025

(54) IMAGE PICKUP APPARATUS AND LENS BARREL

(71) Applicant: CANON KABUSHIKI KAISHA, Tokyo (JP)

(72) Inventors: Wenying Ye, Tokyo (JP); Kazunori Masuda, Saitama (JP); Yoshikazu Inagaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 614 days.

(21) Appl. No.: 17/746,079

(22) Filed: May 17, 2022

(65) Prior Publication Data
US 2022/0373764 A1 Nov. 24, 2022

(30) Foreign Application Priority Data

May 24, 2021 (JP) .................................. 2021-086741
Apr. 15, 2022 (JP) .................................. 2022-067588

(51) Int. Cl.
*G02B 7/04* (2021.01)
*G02B 7/02* (2021.01)
*G03B 17/14* (2021.01)
*H04N 23/51* (2023.01)
*H04N 23/55* (2023.01)

(52) U.S. Cl.
CPC ............... *G02B 7/04* (2013.01); *G02B 7/021* (2013.01); *G03B 17/14* (2013.01); *H04N 23/51* (2023.01); *H04N 23/55* (2023.01)

(58) Field of Classification Search
None
See application file for complete search history.

(56) References Cited

FOREIGN PATENT DOCUMENTS

JP 2010-087025 A 4/2010

*Primary Examiner* — Robert E. Tallman
(74) *Attorney, Agent, or Firm* — Venable LLP

(57) ABSTRACT

An image pickup apparatus includes an image sensor, a lens, and an electric module disposed outside the lens when viewed in a first direction. The electric module includes a first inductor, a first transformer, a second inductor, and a second transformer. A second terminal of the first inductor is connected to a third terminal of the first primary winding. A fifth terminal of the second inductor is connected to a seventh terminal of the second primary winding. The first inductor is wound clockwise from a first terminal toward the second terminal. The second inductor is wound counterclockwise from a sixth terminal toward the fifth terminal. The first primary winding is wound counterclockwise from the third terminal toward a fourth terminal. The second primary winding is wound clockwise from the seventh terminal toward the eighth terminal.

15 Claims, 17 Drawing Sheets

IMAGE PICKUP APPARATUS AND LENS BARREL

BACKGROUND OF THE INVENTION

Field of the Invention

The present disclosure relates to a technology for taking countermeasures against magnetic field noise in an image pickup apparatus.

Description of the Related Art

An image pickup apparatus, such as a digital video camera or a digital still camera, includes an image sensor. If the image sensor is subjected to magnetic field noise, the magnetic field noise will disturb images captured by the image pickup apparatus. For reducing the magnetic field noise, Japanese Patent Application Publication No. 2010-87025 discloses an electronic circuit apparatus that includes two inductors.

In recent years, the ISO sensitivity of image sensors has been increased. Thus, it is desired to produce clearer images even if the images are obtained by capturing images of scenes, such as night scenes, that have less light. However, as the ISO sensitivity of image sensors increases, the sensitivity of image sensors to weak magnetic field noise, which has been unproblematic, also increases. For this reason, it has been desired to further reduce the magnetic field noise.

SUMMARY OF THE INVENTION

According to a first aspect of the present invention, an image pickup apparatus includes an image sensor, a lens, and an electric module disposed outside the lens when viewed in a first direction extending along an optical axis of the lens. The electric module includes a first inductor including a first terminal and a second terminal, a first transformer including a first primary winding including a third terminal and a fourth terminal, a second inductor including a fifth terminal and a sixth terminal, and a second transformer including a second primary winding including a seventh terminal and an eighth terminal. The second terminal of the first inductor is connected to the third terminal of the first primary winding. The fifth terminal of the second inductor is connected to the seventh terminal of the second primary winding. When viewed in the first direction, the first inductor is wound clockwise from the first terminal toward the second terminal. When viewed in the first direction, the second inductor is wound counterclockwise from the sixth terminal toward the fifth terminal. When the first primary winding is viewed from a first axis that extends in parallel with the optical axis and intersects the lens, the first primary winding is wound counterclockwise from the third terminal toward the fourth terminal. When the second primary winding is viewed from a second axis that extends in parallel with the optical axis and intersects the lens, the second primary winding is wound clockwise from the seventh terminal toward the eighth terminal.

According to a second aspect of the present invention, an image pickup apparatus includes an image-pickup-apparatus body, and a lens barrel configured to be detachably attached to the image-pickup-apparatus body. The lens barrel includes a lens, and an electric module disposed outside the lens when viewed in a first direction extending along an optical axis of the lens. The electric module includes a first inductor including a first terminal and a second terminal, a first transformer including a first primary winding including a third terminal and a fourth terminal, a second inductor including a fifth terminal and a sixth terminal, and a second transformer including a second primary winding including a seventh terminal and an eighth terminal. The second terminal of the first inductor is connected to the third terminal of the first primary winding. The fifth terminal of the second inductor is connected to the seventh terminal of the second primary winding. When viewed in the first direction, the first inductor is wound clockwise from the first terminal toward the second terminal. When viewed in the first direction, the second inductor is wound counterclockwise from the sixth terminal toward the fifth terminal. When the first primary winding is viewed from a first axis that extends in parallel with the optical axis and intersects the lens, the first primary winding is wound counterclockwise from the third terminal toward the fourth terminal. When the second primary winding is viewed from a second axis that extends in parallel with the optical axis and intersects the lens, the second primary winding is wound clockwise from the seventh terminal toward the eighth terminal.

According to a third aspect of the present invention, a lens barrel is configured to be detachably attached to an image-pickup-apparatus body. The lens barrel includes a lens, and an electric module disposed outside the lens when viewed in a first direction extending along an optical axis of the lens. The electric module includes a first inductor including a first terminal and a second terminal, a first transformer including a first primary winding including a third terminal and a fourth terminal, a second inductor including a fifth terminal and a sixth terminal, and a second transformer including a second primary winding including a seventh terminal and an eighth terminal. The second terminal of the first inductor is connected to the third terminal of the first primary winding. The fifth terminal of the second inductor is connected to the seventh terminal of the second primary winding. When viewed in the first direction, the first inductor is wound clockwise from the first terminal toward the second terminal. When viewed in the first direction, the second inductor is wound counterclockwise from the sixth terminal toward the fifth terminal. When the first primary winding is viewed from a first axis that extends in parallel with the optical axis and intersects the lens, the first primary winding is wound counterclockwise from the third terminal toward the fourth terminal. When the second primary winding is viewed from a second axis that extends in parallel with the optical axis and intersects the lens, the second primary winding is wound clockwise from the seventh terminal toward the eighth terminal.

Further features of the present invention will become apparent from the following description of exemplary embodiments with reference to the attached drawings.

DESCRIPTION OF THE EMBODIMENTS

Figure 1:
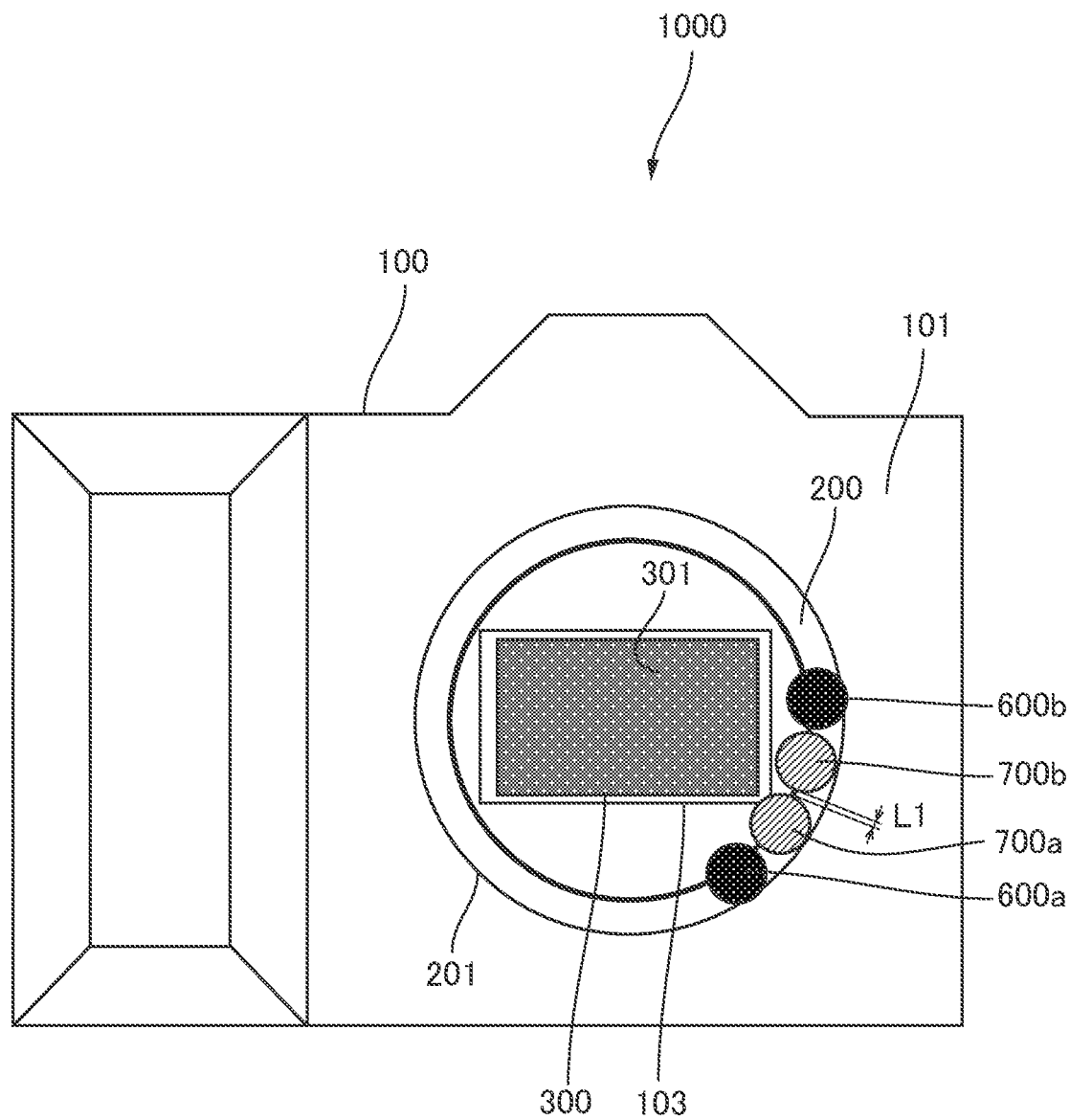
FIG. 1 is a diagram illustrating a digital camera that is one example of image pickup apparatuses of an embodiment.
Figure 1:
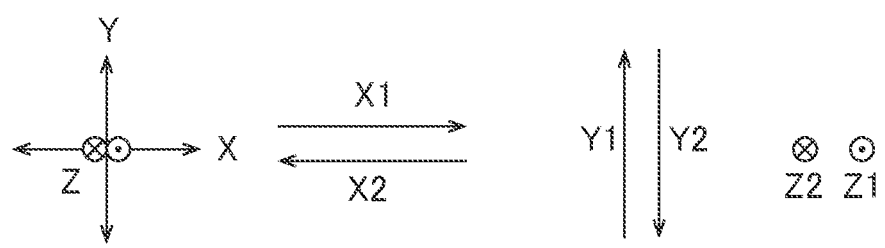
Figure 2:
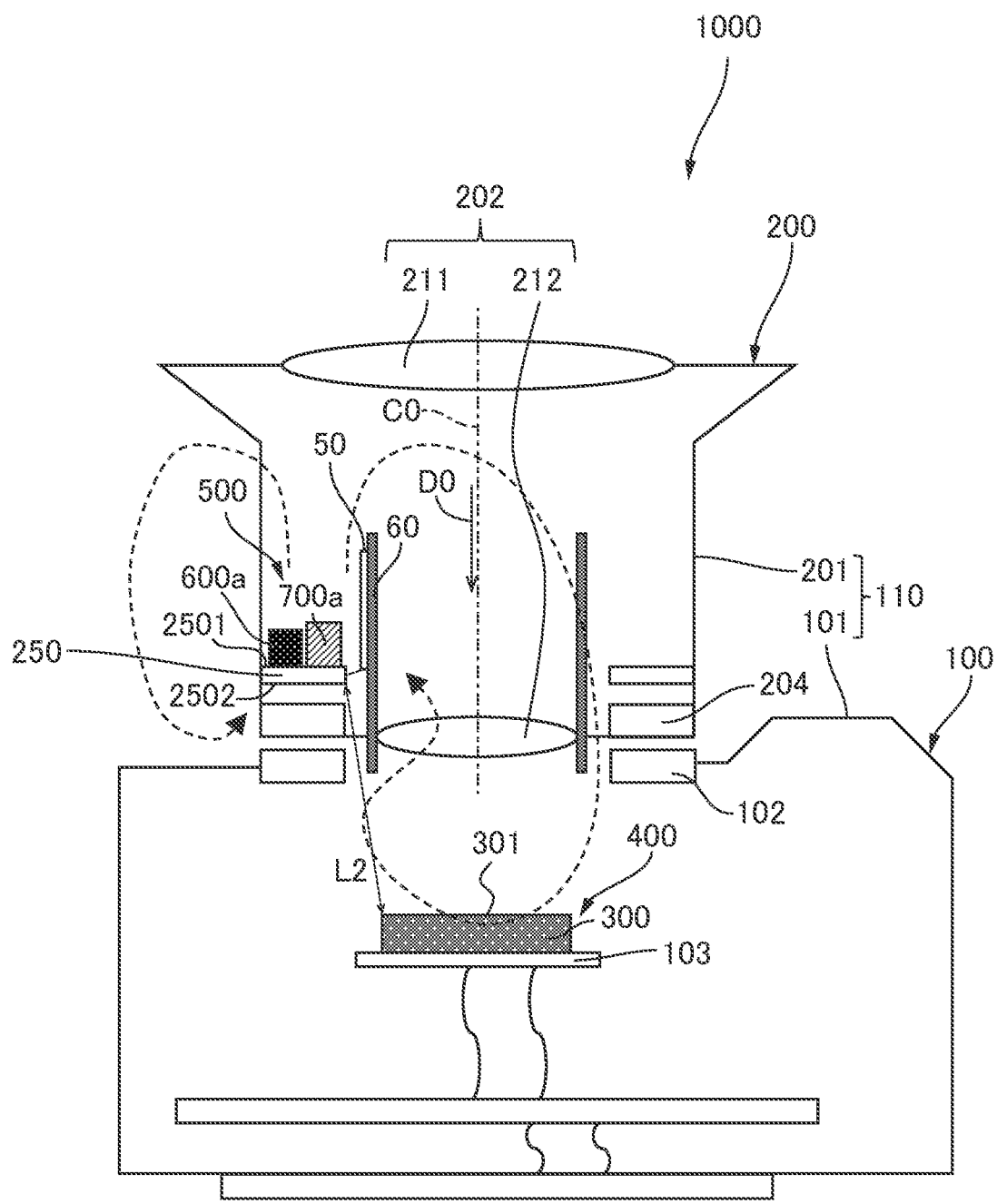
FIG. 2 is a diagram illustrating the digital camera that is one example of image pickup apparatuses of an embodiment.
Figure 2:
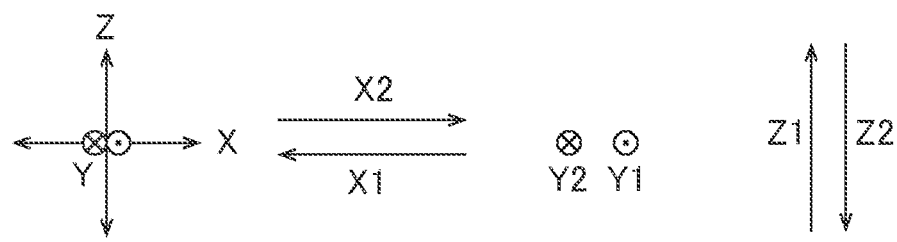

Hereinafter, an embodiment of the present invention will be described in detail with reference to the accompanying drawings. FIGS. 1 and 2 are diagrams illustrating a digital camera 1000 that is one example of an image pickup apparatus of an embodiment. FIG. 1 is a schematic diagram of the digital camera 1000 viewed from the front side of the digital camera 1000. FIG. 2 is a schematic diagram of the digital camera 1000 viewed from the top side of the digital camera 1000.

The digital camera 1000 is a digital single-lens reflex camera, for example. The digital camera 1000 includes a camera body 100 that is an image-pickup-apparatus body, and a lens barrel 200 that can be attached to and detached from the camera body 100. The lens barrel 200 is an interchangeable lens. Hereinafter, a positional relationship between components of the lens barrel 200 and components of the camera body 100 will be described for the state in which the lens barrel 200 is attached to the camera body 100.

The camera body 100 includes an exterior case 101 that is one portion of a housing 110 of the digital camera 1000, and that is a housing of the camera body 100. The exterior case 101 includes an attachment portion 102, to which the lens barrel 200 is attached. The attachment portion 102 is formed like a ring when viewed from the front side of the attachment portion 102.

The camera body 100 also includes an image pickup unit 400 disposed inside the exterior case 101. The image pickup unit 400 includes an image sensor 300 that includes a light receiving surface 301, an electronic component (not illustrated) that controls an image signal, and a printed wiring board 103 on which the image sensor 300 and the electronic component (not illustrated) are mounted. The light receiving surface 301 is rectangular when viewed from the front side of the light receiving surface 301.

For the description, an XYZ coordinate system is defined with respect to the image sensor 300. A Z direction is defined as a direction perpendicular to the light receiving surface 301 of the image sensor 300. An X direction is defined as a direction perpendicular to the Z direction and extending along a long side of the light receiving surface 301 of the image sensor 300. A Y direction is defined as a direction perpendicular to the Z direction and extending along a short side of the light receiving surface 301. Of the Z direction, a Z1 direction is a normal-line direction of the light receiving surface 301, and a Z2 direction is a direction opposite to the normal-line direction of the light receiving surface 301. That is, the Z2 direction is a direction opposite to the Z1 direction. The Z2 direction is a direction in which the front of the light receiving surface 301 of the image sensor 300 is viewed. FIG. 1 is a diagram of the digital camera 1000 viewed in the Z2 direction. Of the X direction, an X1 direction is a rightward direction in FIG. 1, and an X2 direction is a leftward direction in FIG. 1. That is, the X2 direction is a direction opposite to the X1 direction. Of the Y direction, a Y1 direction is an upward direction in FIG. 1, and a Y2 direction is a downward direction in FIG. 1. That is, the Y2 direction is a direction opposite to the Y1 direction.

The lens barrel 200 includes a lens housing 201 that is one portion of the housing 110 of the digital camera 1000, and that is a housing of the lens barrel 200. The lens barrel 200 also includes an image-pickup optical system 202 that is disposed inside the lens housing 201, and that forms an optical image on the light receiving surface 301 of the image sensor 300 in a state where the lens barrel 200 is attached to the exterior case 101. The lens barrel 200 also includes a mount 204 formed like a ring when viewed from the front side of the mount 204, and attached to the attachment portion 102 of the exterior case 101. In the present embodiment, the exterior case 101 and the lens housing 201 constitute the housing 110 of the digital camera 1000.

The image sensor 300 may be a CMOS image sensor or a CCD image sensor. The external shape of the image sensor 300 is rectangular when viewed in the Z2 direction. The image sensor 300 is disposed inside the exterior case 101 such that the light receiving surface 301 faces the image-pickup optical system 202 in the optical-axis direction in a state where the lens barrel 200 is attached to the exterior case 101. The image sensor 300 performs photoelectric conversion on an optical image formed on the light receiving surface 301, and output an image signal to the printed wiring board 103.

The image-pickup optical system 202 includes a plurality of lenses 211 and 212. The lens 211 is a subject-side lens, which is disposed on a side of the lens housing 201 from which the light enters the lens housing 201. The lens 212 is an image-pickup-apparatus-body side lens, which is disposed on a side of the lens housing 201 from which the light exits. The optical axis of the image-pickup optical system 202 is equal to an optical axis C0 of the lens 212. The lens 211 is fixed to the lens housing 201. The lens 212 is supported by the lens housing 201 via a slider 60, such that the lens 212 can move in a direction parallel to the optical axis C0. The traveling direction of the light that travels in a direction parallel to the optical axis C0 is defined as a direction D0 indicated by an arrow. The direction D0 is one example of a first direction. The optical axis C0 intersects the light receiving surface 301 of the image sensor 300, at right angles. Thus, the direction D0 is the same direction as the Z2 direction.

The lens barrel 200 includes a driving motor 50 that is disposed inside the lens housing 201, and that drives the lens 212 of the image-pickup optical system 202 via the slider 60. The driving motor 50 is one example of a load. The lens barrel 200 also includes a driving module 500. The driving module 500 is disposed inside the lens housing 201, and outside the lens 212 when viewed in the direction D0. The driving module 500 supplies electric power to the driving motor 50 such that the driving module 500 controls the driving operation of the driving motor 50 that drives the lens 212 of the image-pickup optical system 202. The driving module 500 is one example of a printed circuit board, and is one example of an electric module.

The driving module 500 includes a printed wiring board 250, two inductors 600a and 600b, and two transformers 700a and 700b. The two inductors 600a and 600b, and the two transformers 700a and 700b are mounted on the printed wiring board 250. The inductor 600a is one example of a first inductor. The inductor 600b is one example of a second inductor. The transformer 700a is one example of a first transformer. The transformer 700b is one example of a second transformer. Note that in FIG. 2, only the inductor 600a of the two inductors 600a and 600b, and only the transformer 700a of the two transformers 700a and 700b are schematically illustrated.

The printed wiring board 250 of the driving module 500 has a shape that does not block the optical path extending from the image-pickup optical system 202 to the light receiving surface 301 of the image sensor 300. In the present embodiment, the printed wiring board 250 is formed like a ring when viewed in the Z direction. The inductors 600a and 600b and the transformers 700a and 700b are mounted on a main surface 2501 of the printed wiring board 250, which is opposite to a main surface 2502 of the printed wiring board 250 that faces the camera body 100. The main surface 2501 is a first main surface, and the main surface 2502 is a second main surface. The main surface 2502 of the main surfaces 2501 and 2502 is closer to the light receiving surface 301 of the image sensor 300 than the main surface 2501 is. In addition, a distance L1 between the transformer 700a and the transformer 700b is smaller than a distance L2 between the driving module 500 and the image sensor 300.

The digital camera 1000 is a contrast-detection autofocus camera, which detects a signal that corresponds to a focus evaluation value of a subject, and which focuses the light by causing the driving module 500 to drive the image-pickup optical system 202.

Figure 3:
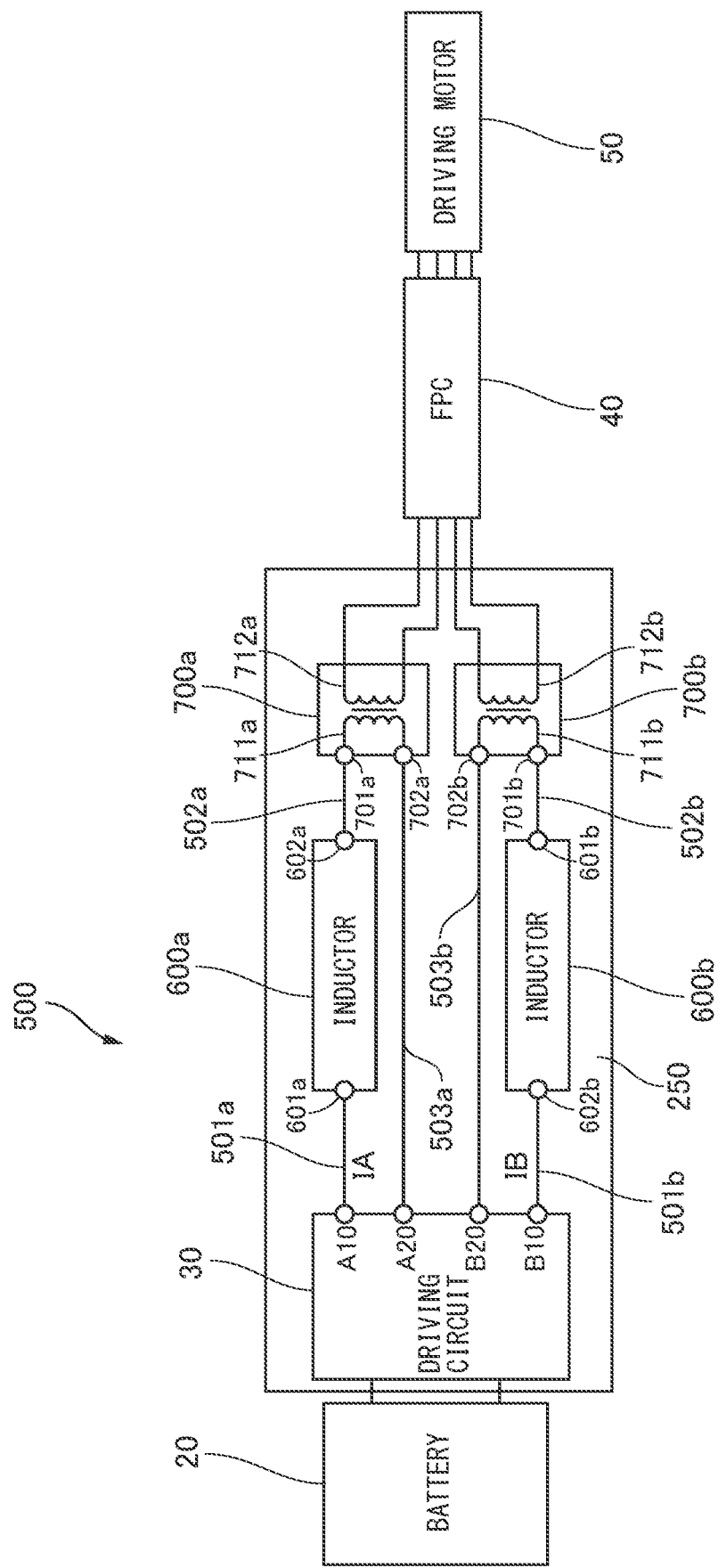
FIG. 3 is a block diagram for illustrating a circuit configuration of a driving module and a driving motor of an embodiment.

FIG. 3 is a block diagram for illustrating a circuit configuration of the driving module 500 and the driving motor 50 of an embodiment. Inside the exterior case 101 of the camera body 100, a battery 20 is disposed. The driving module 500 includes a driving circuit 30 that is supplied with a direct-current voltage from the battery 20, and that outputs an A-phase driving current IA and a B-phase driving current IB. The A-phase driving current IA and B-phase driving current IB are alternating current for operating the driving motor 50. The driving current IA is one example of a first alternating current. The driving current IB is one example of a second alternating current. Each of the A-phase driving current IA and the B-phase driving current IB is an alternating current having a driving frequency, for example, in a range equal to or larger than 1 kHz and smaller than 1 MHz (i.e., the kilohertz band).

The driving module 500 includes the printed wiring board 250, the driving circuit 30, the two inductors 600a and 600b, and the two transformers 700a and 700b. The driving circuit 30, the two inductors 600a and 600b, and the two transformers 700a and 700b are mounted on the printed wiring board 250. The driving circuit 30 includes terminals A10 and A20 that output the A-phase driving current IA, and terminals B10 and B20 that output the B-phase driving current IB. The printed wiring board 250 includes a plurality of traces 501a, 502a, 503a, 501b, 502b, and 503b.

The inductor 600a includes two terminals 601a and 602a. The terminal 601a is one example of a first terminal, and the terminal 602a is one example of a second terminal. The transformer 700a includes a primary winding 711a and a secondary winding 712a. The primary winding 711a is one example of a first primary winding. The secondary winding 712a is one example of a first secondary winding. The secondary winding 712a outputs a voltage, to which a voltage applied across the primary winding 711a is boosted. The primary winding 711a includes two terminals 701a and 702a. The terminal 701a is one example of a third terminal, and the terminal 702a is one example of a fourth terminal.

The terminal A10 of the driving circuit 30 and the terminal 601a of the inductor 600a are electrically connected to each other via the trace 501a. The terminal 602a of the inductor 600a and the terminal 701a of the primary winding 711a of the transformer 700a are electrically connected to each other via the trace 502a. The terminal 702a of the primary winding 711a and the terminal A20 of the driving circuit 30 are electrically connected to each other via the trace 503a. Thus, the inductor 600a and the primary winding 711a of the transformer 700a are connected in series to each other. In addition, since the A-phase driving current IA is an alternating current, the A-phase driving current IA switches periodically between a current having a phase outputted from the terminal A10, and a current having a phase outputted from the terminal A20. The driving current IA having a phase outputted from the terminal A10 is referred to as a positive current. In contrast, the driving current IA having a phase outputted from the terminal A20 is referred to as a negative current. When the driving current IA is positive, the driving current IA flows to the terminal A20 through the inductor 600a and the primary winding 711a. In contrast, when the driving current IA is negative, the driving current IA flows to the terminal A10 through the primary winding 711a and the inductor 600a.

The inductor 600b includes two terminals 601b and 602b. The terminal 601b is one example of a fifth terminal, and the terminal 602b is one example of a sixth terminal. The transformer 700b includes a primary winding 711b and a secondary winding 712b. The secondary winding 712b outputs a voltage, to which a voltage applied across the primary winding 711b is boosted. The primary winding 711b is one example of a second primary winding. The secondary winding 712b is one example of a second secondary winding. The primary winding 711b includes two terminals 701b and 702b. The terminal 701b is one example of a seventh terminal, and the terminal 702b is one example of an eighth terminal.

The terminal B10 of the driving circuit 30 and the terminal 602b of the inductor 600b are electrically connected to each other via the trace 501b. The terminal 601b of the inductor 600b and the terminal 701b of the primary winding 711b of the transformer 700b are electrically connected to each other via the trace 502b. The terminal 702b of the primary winding 711b and the terminal B20 of the driving circuit 30 are electrically connected to each other via the trace 503b. Thus, the inductor 600b and the primary winding 711b of the transformer 700b are connected in series to each other. In addition, since the B-phase driving current IB is an alternating current, the B-phase driving current IB switches periodically between a current having a phase outputted from the terminal B10, and a current having a phase outputted from the terminal B20. The driving current IB having a phase outputted from the terminal B10 is referred to as a positive current. In contrast, the driving current IB having a phase outputted from the terminal B20 is referred to as a negative current. When the driving current IB is positive, the driving current IB flows to the terminal B20 through the inductor 600b and the primary winding 711b. In contrast, when the driving current IB is negative, the driving current IB flows to the terminal B10 through the primary winding 711b and the inductor 600b.

In this manner, the driving circuit 30 supplies the driving current IA to the inductor 600a and the primary winding 711a of the transformer 700a connected in series to each other, and supplies the driving current IB to the inductor 600b and the primary winding 711b of the transformer 700b connected in series to each other. The difference in phase between the A-phase driving current IA outputted from the terminals A10 and A20 of the driving circuit 30 and the B-phase driving current IB outputted from the terminals B10 and B20 of the driving circuit 30 is in a range equal to or larger than −90 degrees and equal to or smaller than 90 degrees.

The A-phase driving current IA causes a secondary current that flows in the secondary winding 712a of the transformer 700a, into the driving motor 50 through a flexible printed circuit board (FPC) 40. Similarly, the B-phase driving current IB causes a secondary current that flows in the secondary winding 712b of the transformer 700b, into the driving motor 50 through the FPC 40. Each of the driving currents IA and IB outputted from the driving circuit 30 may have undesired high-frequency current superposed on the driving current. For this reason, the inductor 600a is disposed between the driving circuit 30 and the FPC 40 for eliminating the high-frequency current from the A-phase driving current IA, and the inductor 600b is disposed between the driving circuit 30 and the FPC 40 for eliminating the high-frequency current from the B-phase driving current IB. In addition, for boosting the voltage outputted from the driving circuit 30, the transformer 700a is disposed between the driving circuit 30 and the FPC 40 for the A-phase driving current IA, and the transformer 700b is disposed between the driving circuit 30 and the FPC 40 for the B-phase driving current IB. That is, the A-phase driving current IA outputted from the driving circuit 30 is supplied, as a secondary current, to the driving motor 50 via the inductor 600a and the transformer 700a. In addition, the B-phase driving current IB outputted from the driving circuit 30 is supplied, as a secondary current, to the driving motor 50 via the inductor 600b and the transformer 700b.

When the current flows through the inductors 600a and 600b and the transformers 700a and 700b, a leakage magnetic field is generated from each of the inductors 600a and 600b and the transformers 700a and 700b. If the leakage magnetic field reaches the image sensor 300 illustrated in FIG. 2, the leakage magnetic field becomes a magnetic field noise in the image sensor 300. Note that although the leakage magnetic field is indicated by a broken line arrow in FIG. 2, the direction of the leakage magnetic field switches between the direction indicated by the broken line arrow and a direction opposite to the direction indicated by the broken line arrow, because the leakage magnetic field is an alternating-current magnetic field caused by the alternating current.

Next, the relationship between the applied current and the leakage magnetic field will be described for the inductor 600a and the transformer 700a.

Figure 4:
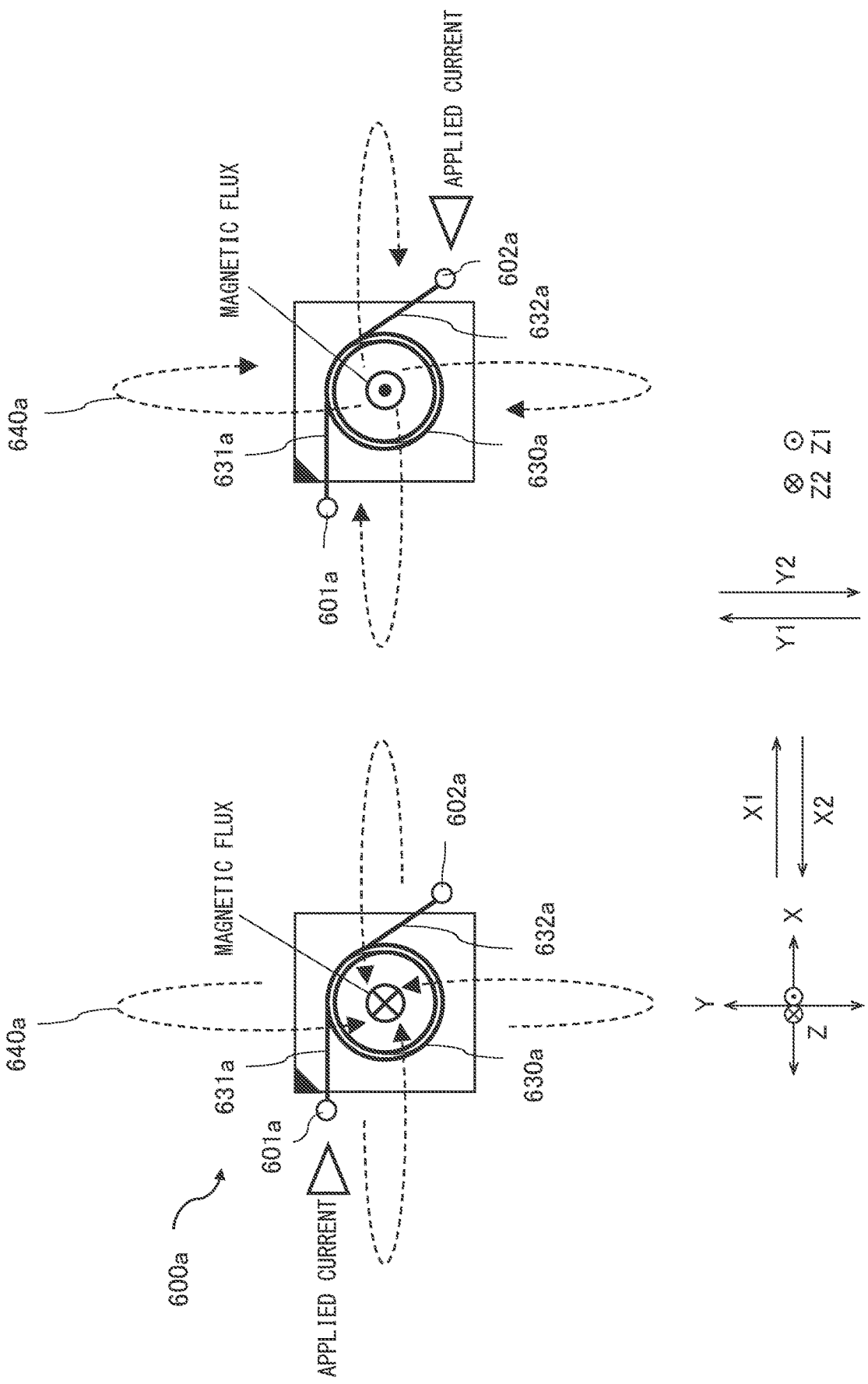
FIG. 4 is a component top-surface view of an inductor of an embodiment.

FIG. 4 is a component top-surface view of the inductor 600a of an embodiment. The inductor 600a includes a winding portion 630a, a pair of line portions 631a and 632a that extend from the winding portion 630a, a pair of terminals 601a and 602a, and a magnetic core (not illustrated). The winding portion 630a is wound around the magnetic core (not illustrated). When the inductor 600a is viewed in the Z2 direction, the winding portion 630a is wound clockwise from the terminal 601a toward the terminal 602a. In FIG. 4, a corner of the inductor 600a at which the terminal 601a is disposed is marked with a black triangle.

The winding portion 630a and the pair of line portions 631a and 632a are made of electrically conductive material, such as copper. The winding portion 630a and the pair of line portions 631a and 632a are a single continuous conductor wire. That is, the winding portion 630a and the pair of line portions 631a and 632a are continuous. The winding portion 630a and the pair of line portions 631a and 632a are surrounded by the magnetic core (not illustrated). The magnetic core is made of a magnetic material, such as ferrite. The pair of line portions 631a and 632a is respectively joined with the pair of terminals 601a and 602a, via a joining member such as solder. That is, the line portion 631a is joined with the terminal 601a, and the line portion 632a is joined with the terminal 602a. The terminals 601a and 602a are made of electrically conductive material. The terminals 601a and 602a are bonded to the magnetic core (not illustrated). The winding portion 630a is wound around the magnetic core (not illustrated). The conductor wire of the winding portion 630a is coated with insulator (not illustrated). In addition, a portion of the conductor wire of the line portion 631a other than a portion of the conductor wire joined with the terminal 601a is coated with insulator (not illustrated), and a portion of the conductor wire of the line portion 632a other than a portion of the conductor wire joined with the terminal 602a is coated with insulator (not illustrated).

When the terminal 601a is applied with the positive current, the current flows in the winding portion 630a clockwise in a component top-surface view, that is, when viewed in the Z2 direction. In FIG. 4, broken lines indicate a leakage magnetic field 640a from the inductor 600a. Inside the inductor 600a, that is, inside the winding portion 630a, magnetic flux is generated in the Z2 direction. Thus, the leakage magnetic field 640a is generated radially in directions that intersect the Z direction.

In addition, when the terminal 602a is applied with positive current, the current flows in the winding portion 630a counterclockwise in a component top-surface view, that is, when viewed in the Z2 direction. Inside the inductor 600a, that is, inside the winding portion 630a, magnetic flux is generated in the Z1 direction. Thus, the leakage magnetic field 640a is generated radially in directions that intersect the Z direction. Note that the inductor 600b has the same structure as that of the inductor 600a.

Figure 5:
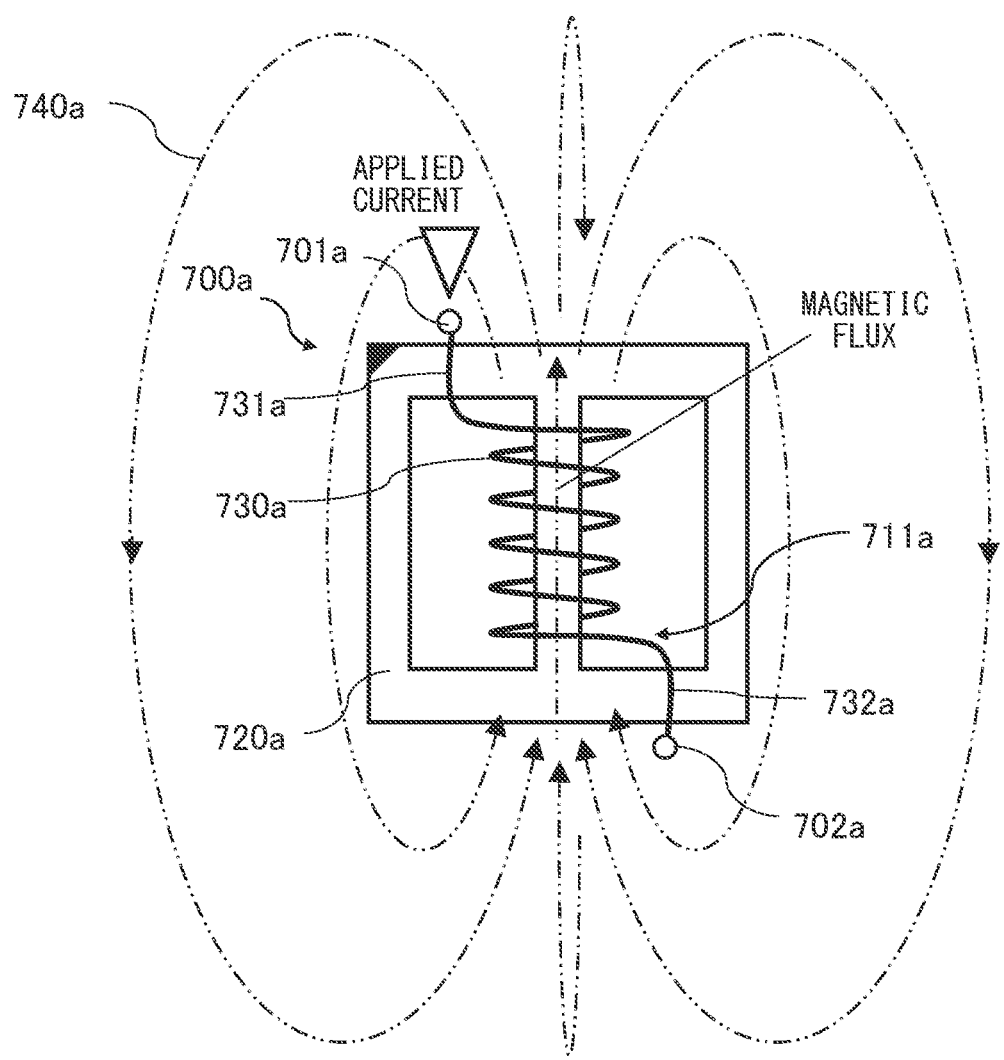
FIG. 5 is a component top-surface view of a transformer of an embodiment.
Figure 5:
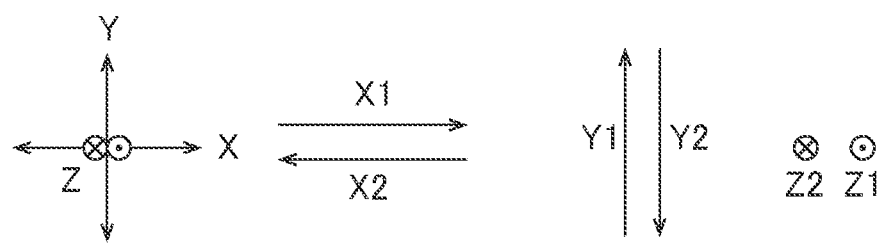

FIG. 5 is a component top-surface view of the transformer 700a of an embodiment. The transformer 700a includes the primary winding 711a, the secondary winding 712a (FIG. 3), and a magnetic core 720a. The primary winding 711a includes a winding portion 730a, a pair of line portions 731a and 732a that extends from the winding portion 730a, and a pair of terminals 701a and 702a. The primary winding 711a and the secondary winding 712a (FIG. 3) are wound around the magnetic core 720a. When viewed in the Y2 direction, the primary winding 711a is wound counterclockwise from the terminal 701a toward the terminal 702a. In FIG. 5, a corner of the transformer 700a at which the terminal 701a is disposed is marked with a black triangle.

The winding portion 730a and the pair of line portions 731a and 732a are made of electrically conductive material, such as copper. The winding portion 730a and the pair of line portions 731a and 732a are a single continuous conductor wire. That is, the winding portion 730a and the pair of line portions 731a and 732a are continuous. The pair of line portions 731a and 732a is respectively joined with the pair of terminals 701a and 702a, via a joining member such as solder. That is, the line portion 731a is joined with the terminal 701a, and the line portion 732a is joined with the terminal 702a. The terminals 701a and 702a are made of electrically conductive material. The terminals 701a and 702a are bonded to the magnetic core 720a. The winding portion 730a is wound around the magnetic core 720a. The conductor wire of the winding portion 730a is coated with insulator (not illustrated). In addition, a portion of the conductor wire of the line portion 731a other than a portion of the conductor wire joined with the terminal 701a is coated with insulator (not illustrated), and a portion of the conductor wire of the line portion 732a other than a portion of the conductor wire joined with the terminal 702a is coated with insulator (not illustrated). The magnetic core 720a is made of a magnetic material, such as ferrite.

When the terminal 701a is applied with the positive current, the current flows in the winding portion 730a counterclockwise when viewed in the Y2 direction. Inside the winding portion 730a, magnetic flux is generated in the Y1 direction. In FIG. 5, alternate long and two short dashed lines indicate a leakage magnetic field 740a from the transformer 700a. Note that the transformer 700b has the same structure as that of the transformer 700a.

Figure 6:
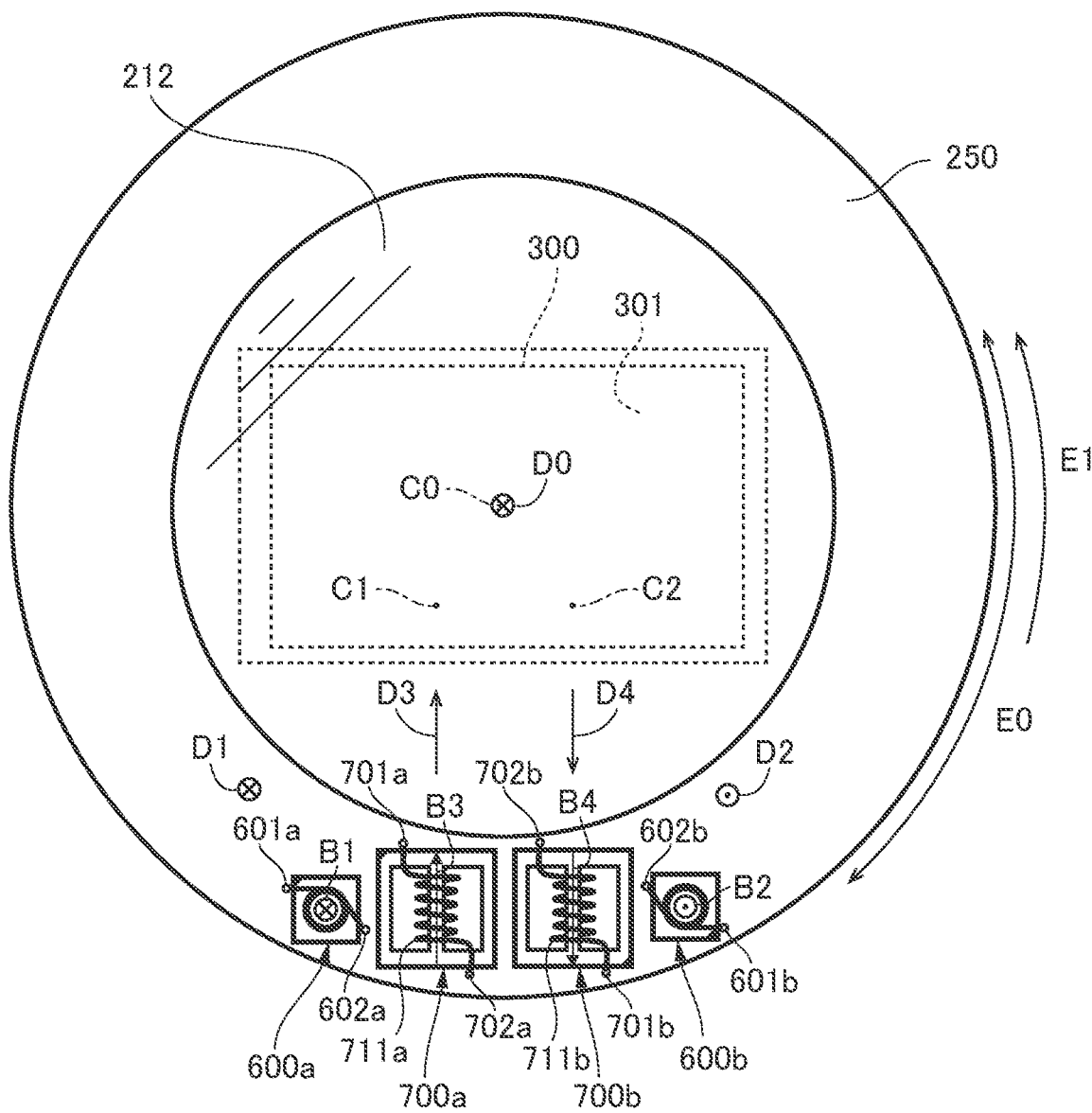
FIG. 6 is a component top-surface view illustrating a positional relationship of components of an embodiment.
Figure 6:
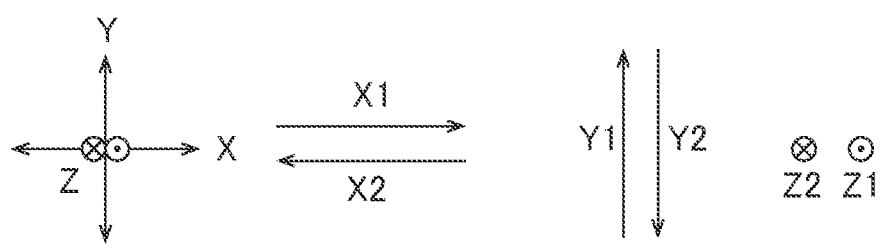
Figure 7:
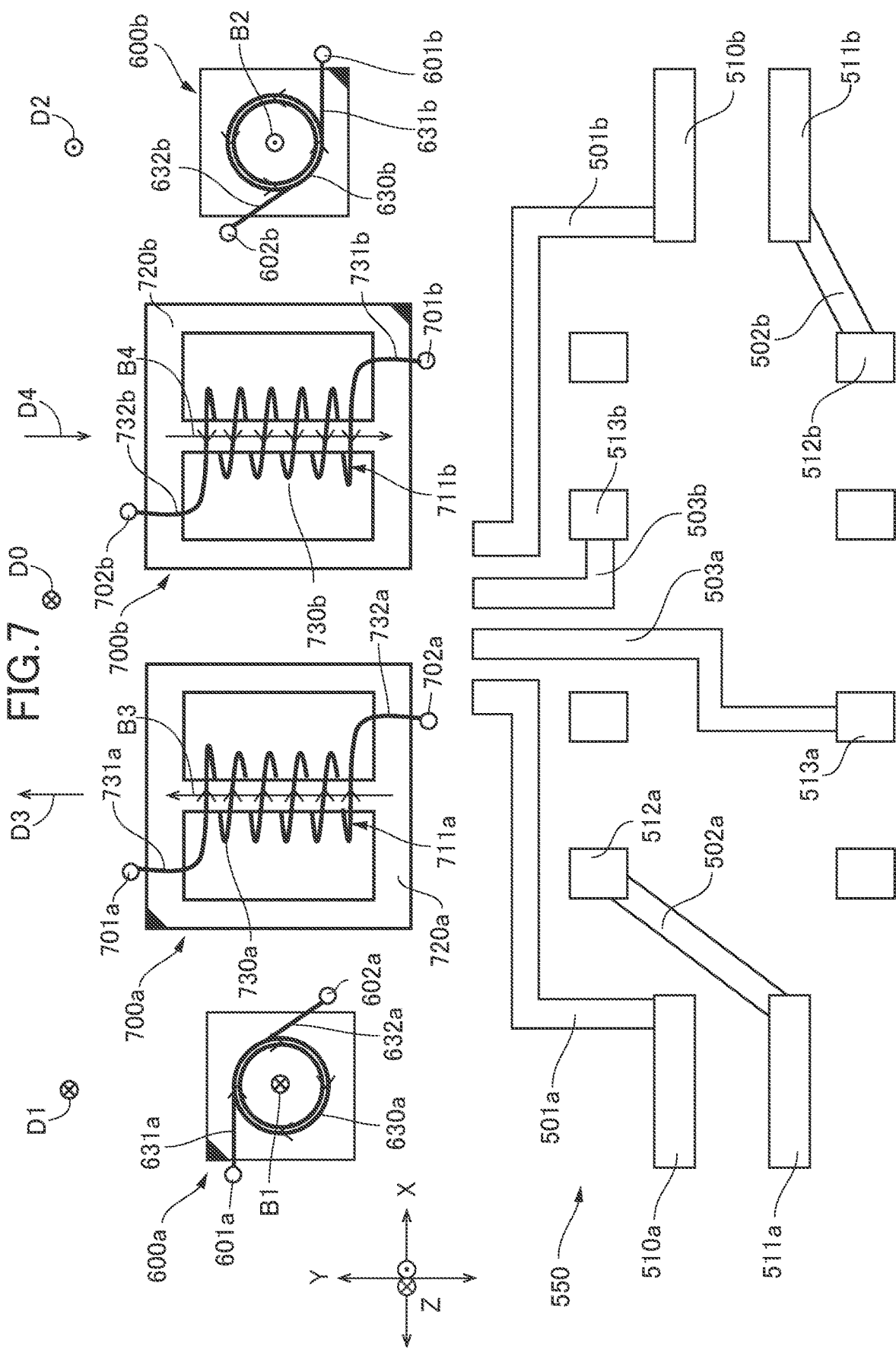
FIG. 7 is a schematic diagram for illustrating a relationship between the components and a wiring pattern of an embodiment.

FIG. 6 is a component top-surface view illustrating a positional relationship between the inductor 600a, the inductor 600b, the transformer 700a, the transformer 700b, the printed wiring board 250, the lens 212, and the image sensor 300 of an embodiment. FIG. 7 is a schematic diagram for illustrating a positional relationship between the inductor 600a, the inductor 600b, the transformer 700a, the transformer 700b, and a wiring pattern 550 that is one portion of a wiring pattern of the printed wiring board 250. For convenience of the description, the inductors 600a and 600b and the transformers 700a and 700b are separated from the wiring pattern 550 in FIG. 7. Hereinafter, arrangement of the inductors 600a and 600b and the transformers 700a and 700b will be described with reference to FIGS. 6 and 7.

The inductor 600a includes the two terminals 601a and 602a, the two line portions 631a and 632a, the winding portion 630a, and the magnetic core (not illustrated). The inductor 600b includes the two terminals 601b and 602b, the two line portions 631b and 632b, the winding portion 630b, and the magnetic core (not illustrated). The transformer 700a includes the primary winding 711a and the magnetic core 720a. The transformer 700b includes the primary winding 711b and the magnetic core 720b. The primary winding 711a of the transformer 700a includes the two terminals 701a and 702a, the two line portions 731a and 732a, and the winding portion 730a. The primary winding 711b of the transformer 700b includes the two terminals 701b and 702b, the two line portions 731b and 732b, and the winding portion 730b.

The trace 501a is connected and integrated with a pad 510a, the trace 502a is connected and integrated with pads 511a and 512a, and the trace 503a is connected and integrated with a pad 513a. The trace 501b is connected and integrated with a pad 510b, the trace 502b is connected and integrated with pads 511b and 512b, and the trace 503b is connected and integrated with a pad 513b. The terminal 601a is joined with the pad 510a, the terminal 602a is joined with the pad 511a, the terminal 701a is joined with the pad 512a, and the terminal 702a is joined with the pad 513a. The terminal 602b is joined with the pad 510b, the terminal 601b is joined with the pad 511b, the terminal 701b is joined with the pad 512b, and the terminal 702b is joined with the pad 513b.

Thus, the terminal 602a of the inductor 600a is connected to the terminal 701a of the primary winding 711a via the trace 502a. In addition, the terminal 601b of the inductor 600b is connected to the terminal 701b of the primary winding 711b via the trace 502b. That is, the inductor 600a and the transformer 700a are connected in series to each other, and the inductor 600b and the transformer 700b are connected in series to each other.

When viewed in the direction D0, the inductor 600a is wound clockwise from the terminal 601a toward the terminal 602a. Specifically, when viewed in the direction D0, the winding portion 630a of the inductor 600a is wound clockwise from the terminal 601a toward the terminal 602a. In FIG. 7, the direction in which the inductor 600a, or the winding portion 630a, is wound is indicated by arrows illustrated on the inductor 600a.

In addition, when viewed in the direction D0, the inductor 600b is wound counterclockwise from the terminal 602b toward the terminal 601b. Specifically, when viewed in the direction D0, the winding portion 630b of the inductor 600b is wound counterclockwise from the terminal 602b toward the terminal 601b. In FIG. 7, the direction in which the inductor 600b, or the winding portion 630b, is wound is indicated by arrows illustrated on the inductor 600b.

In addition, when viewed from an axis C1, the primary winding 711a is wound counterclockwise from the terminal 701a toward the terminal 702a. The axis C1 is one example of a first axis. The axis C1 extends in parallel with the optical axis C0, and intersects the lens 212. The axis C1 intersects the light receiving surface 301 of the image sensor 300, at right angles. In FIG. 7, the direction in which the primary winding 711a is wound is indicated by arrows illustrated on the transformer 700a.

In addition, when viewed from an axis C2, the primary winding 711b is wound clockwise from the terminal 701b toward the terminal 702b. The axis C2 is one example of a second axis. The axis C2 extends in parallel with the optical axis C0, and intersects the lens 212. The axis C2 intersects the light receiving surface 301 of the image sensor 300, at right angles. In FIG. 7, the direction in which the primary winding 711b is wound is indicated by arrows illustrated on the transformer 700b.

As illustrated in FIG. 6, when viewed in the direction D0, the inductor 600a, the transformer 700a, the transformer 700b, and the inductor 600b are disposed in this order in a circumferential direction E0. In the present embodiment, when viewed in the direction D0, the inductor 600a, the transformer 700a, the transformer 700b, and the inductor 600b are disposed in this order in a counterclockwise direction E1.

In addition, when viewed in the direction D0, the inductor 600a and the transformer 700a are disposed adjacent to each other in the circumferential direction E0, and the inductor 600b and the transformer 700b are disposed adjacent to each other in the circumferential direction E0. Furthermore, when viewed in the direction D0, the transformer 700a and the transformer 700b are disposed adjacent to each other in the circumferential direction E0.

Inside the inductor 600a, a magnetic flux B1 is generated in a direction D1 parallel with the direction D0, by the current supplied to the inductor 600a. The direction D1 is one example of a second direction. The magnetic flux B1 is one example of a first magnetic flux.

Inside the inductor 600b, a magnetic flux B2 is generated in a direction D2 opposite to the direction D1, by the current supplied to the inductor 600b. The direction D2 is one example of a third direction. The magnetic flux B2 is one example of a second magnetic flux.

Inside the primary winding 711a, a magnetic flux B3 is generated in a direction D3 perpendicular to the direction D1, by the current supplied to the primary winding 711a. The direction D3 is one example of a fourth direction. The magnetic flux B3 is one example of a third magnetic flux. When viewed in the direction D0, the axis C1 is on the extension of the magnetic flux B3. That is, the axis (central axis) around which the primary winding 711a is wound intersects the axis C1.

Inside the primary winding 711b, a magnetic flux B4 is generated in a direction D4 opposite to the direction D3, by the current supplied to the primary winding 711b. The direction D4 is one example of a fifth direction. The magnetic flux B4 is one example of a fourth magnetic flux. When viewed in the direction D0, the axis C2 is on the extension of the magnetic flux B4. That is, the axis (central axis) around which the primary winding 711b is wound intersects the axis C2.

By the way, each of the driving currents IA and IB illustrated in FIG. 3 is an alternating current. Thus, the directions D1 to D4 illustrated in FIGS. 6 and 7 are directions determined when the driving currents IA and IB are positive, that is, when the driving current IA flows from the terminal A10 to the terminal A20 and the driving current IB flows from the terminal B10 to the terminal B20. Thus, when the driving current IA is negative, that is, when the driving current IA flows from the terminal A20 to the terminal A10, the direction D1 of the magnetic flux B1 and the direction D3 of the magnetic flux B3 become opposite to the directions indicated by the arrows illustrated in FIGS. 6 and 7. Similarly, when the driving current IB is negative, that is, when the driving current IB flows from the terminal B20 to the terminal B10, the direction D2 of the magnetic flux B2 and the direction D4 of the magnetic flux B4 become opposite to the directions indicated by the arrows illustrated in FIGS. 6 and 7.

The terminal A10 of the driving circuit 30 and the terminal 601a of the inductor 600a are electrically connected to each other; the terminal 602a of the inductor 600a and the terminal 701a of the transformer 700a are electrically connected to each other; and the terminal 702a of the transformer 700a and the terminal A20 of the driving circuit 30 are electrically connected to each other. Thus, the A-phase driving current IA outputted from the terminal A10 of the driving circuit 30 flows to the terminal A20 of the driving circuit 30, through the trace 501a, the pad 510a, the terminal 601a, the line portion 631a, the winding portion 630a, the line portion 632a, the terminal 602a, the pad 511a, the trace 502a, the pad 512a, the terminal 701a, the line portion 731a, the winding portion 730a, the line portion 732a, the terminal 702a, the pad 513a, and the trace 503a in this order. In this case, the A-phase driving current IA flows in the winding portion 630a clockwise in a component top-surface view of the winding portion 630a, that is, when the winding portion 630a is viewed in the Z2 direction. In addition, the A-phase driving current IA flows in the winding portion 730a counterclockwise when the winding portion 730a is viewed in the Y2 direction.

The terminal B10 of the driving circuit 30 and the terminal 602b of the inductor 600b are electrically connected to each other; the terminal 601b of the inductor 600b and the terminal 701b of the transformer 700b are electrically connected to each other; and the terminal 702b of the transformer 700b and the terminal B20 of the driving circuit 30 are electrically connected to each other. Thus, the B-phase driving current IB outputted from the terminal B10 of the driving circuit 30 flows to the terminal B20 of the driving circuit 30, through the trace 501b, the pad 510b, the terminal 602b, the line portion 632b, the winding portion 630b, the line portion 631b, the terminal 601b, the pad 511b, the trace 502b, the pad 512b, the terminal 701b, the line portion 731b, the winding portion 730b, the line portion 732b, the terminal 702b, the pad 513b, and the trace 503b in this order. In this case, the B-phase driving current IB flows in the winding portion 630b counterclockwise in a component top-surface view of the winding portion 630b, that is, when the winding portion 630b is viewed in the Z2 direction. In addition, the B-phase driving current IB flows in the winding portion 730b clockwise when the winding portion 730b is viewed in the Y2 direction.

Figure 8:
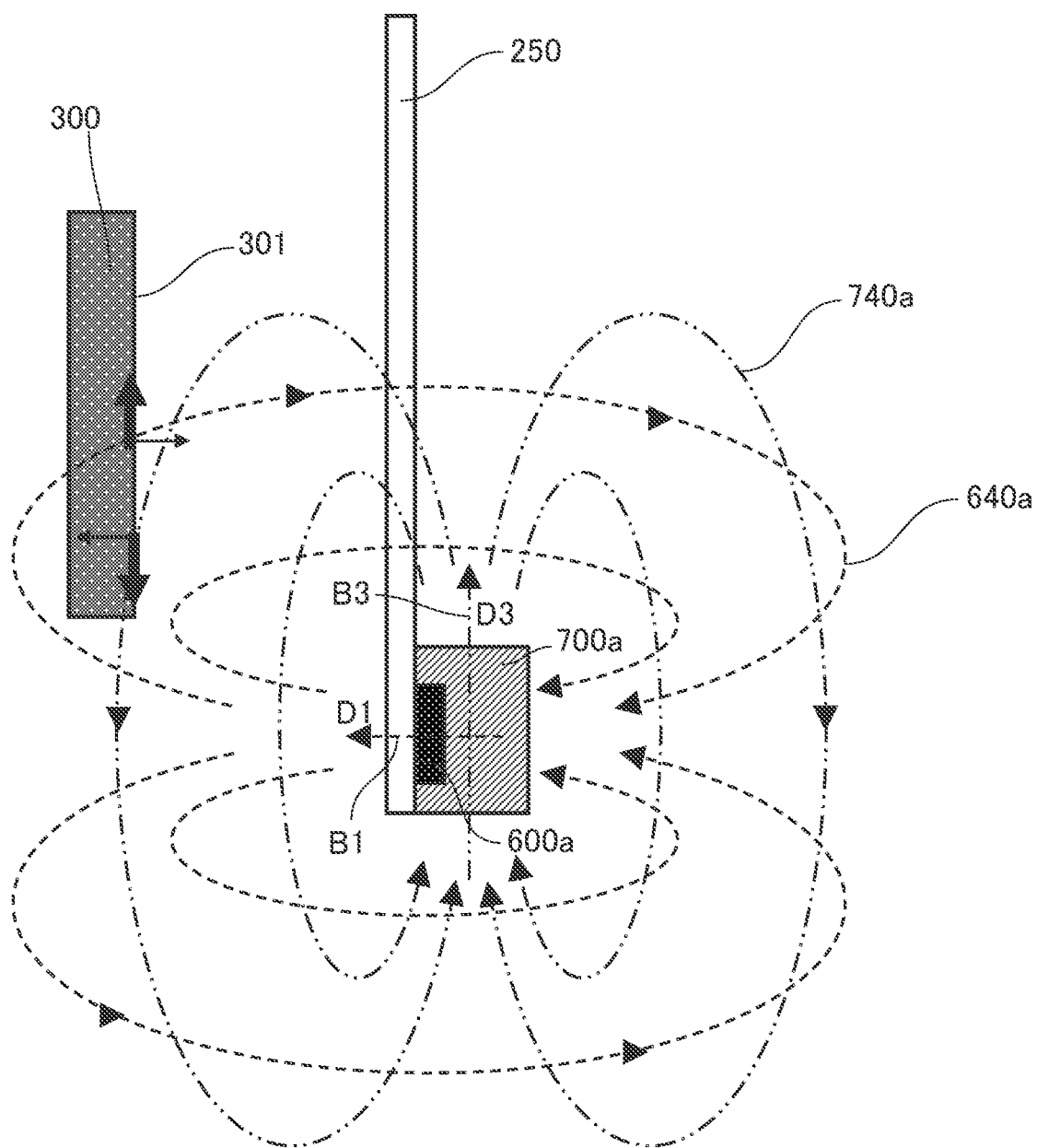
FIG. 8 is a component side-surface view for illustrating magnetic flux that leaks from an inductor and a transformer of an embodiment.

FIG. 8 is a component side-surface view for illustrating magnetic flux that leaks from the inductor 600a and the transformer 700a of an embodiment. In the center of the inductor 600a, that is, in the center of the winding portion 630a, the magnetic flux B1 is generated in the direction D1. In FIG. 8, the direction D1 is equal to the Z2 direction. In FIG. 8, broken lines indicate the leakage magnetic field 640a from the inductor 600a. In the center of the primary winding 711a of the transformer 700a, that is, in the center of the winding portion 730a, the magnetic flux B3 is generated in the direction D3. In FIG. 8, the direction D3 is equal to the Y1 direction. In FIG. 8, alternate long and two short dashed lines indicate the leakage magnetic field 740a from the transformer 700a.

In the present embodiment, the image sensor 300 is a circuit that is subjected to noise. If the magnetic field enters the light receiving surface 301 of the image sensor 300 from the X direction and the Y direction, the magnetic field will easily disturb images captured. For this reason, in the present embodiment, the inductor 600a and the transformer 700a are mounted on the printed wiring board 250 so that the leakage magnetic field generated from the inductor 600a and the leakage magnetic field generated from the transformer 700a cancel each other on the light receiving surface 301 of the image sensor 300.

In the digital camera 1000, the transformer 700a mounted on the printed wiring board 250 disposed in the lens barrel 200 and the image sensor 300 disposed in the camera body 100 are separated from each other in the Y direction and the Z direction. Thus, the leakage magnetic field 740a from the transformer 700a bends before reaching the image sensor 300. Consequently, on the light receiving surface 301 of the image sensor 300, the leakage magnetic field 740a includes a Y-direction component and a Z-direction component.

On the other hand, the leakage magnetic field 640a from the inductor 600a also bends before reaching the image sensor 300. Consequently, on the light receiving surface 301 of the image sensor 300, the leakage magnetic field 640a includes a Y-direction component and a Z-direction component.

In the present embodiment, since the Y-direction component of the leakage magnetic field 640a becomes opposite in direction to the Y-direction component of the leakage magnetic field 740a on the light receiving surface 301, the Y-direction component of the leakage magnetic field 640a and the Y-direction component of the leakage magnetic field 740a cancel each other.

In addition, the inductor 600a and the transformer 700a are connected in series to each other. Thus, the same current flows in the winding portion 630a and the winding portion 730a. As a result, even if the current that flows in the winding portion 630a fluctuates for some reason and the leakage magnetic field 640a fluctuates, the current that flows in the winding portion 730a also fluctuates accordingly and the leakage magnetic field 740a also fluctuates. Consequently, the Y-direction component of the leakage magnetic field 640a having reached the light receiving surface 301 and the Y-direction component of the leakage magnetic field 740a having reached the light receiving surface 301 cancel each other.

Figure 9:
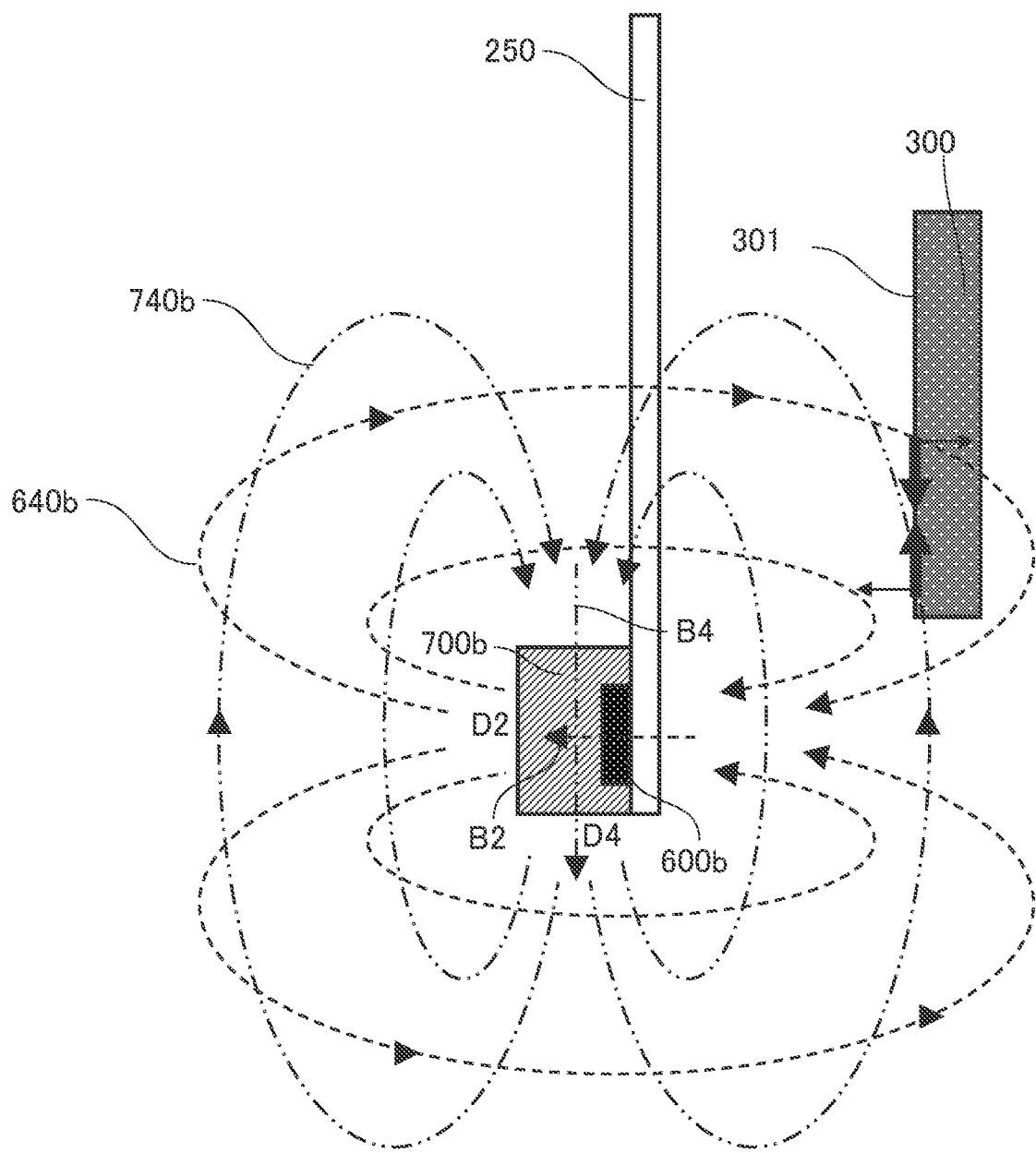
FIG. 9 is a component side-surface view for illustrating magnetic flux that leaks from an inductor and a transformer of an embodiment.
Figure 9:
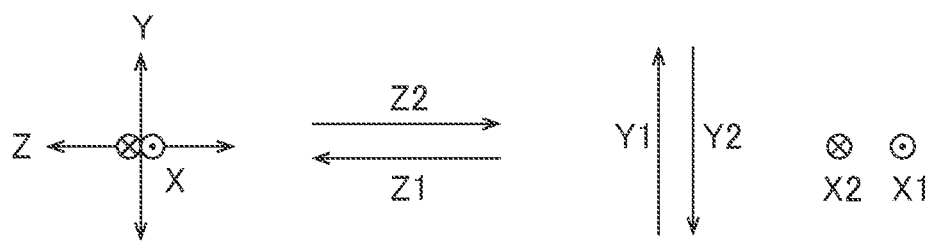

FIG. 9 is a component side-surface view for illustrating magnetic flux that leaks from the inductor 600b and the transformer 700b of an embodiment. In the center of the inductor 600b, that is, in the center of the winding portion 630b, the magnetic flux B2 is generated in the direction D2. In FIG. 9, the direction D2 is equal to the Z1 direction. In FIG. 9, broken lines indicate a leakage magnetic field 640b from the inductor 600b. In the center of the primary winding 711b of the transformer 700b, that is, in the center of the winding portion 730b, the magnetic flux B4 is generated in the direction D4. In FIG. 9, the direction D4 is equal to the Y2 direction. In FIG. 9, alternate long and two short dashed lines indicate a leakage magnetic field 740b from the transformer 700b.

In the present embodiment, since the Y-direction component of the leakage magnetic field 640b becomes opposite in direction to the Y-direction component of the leakage magnetic field 740b on the light receiving surface 301, the Y-direction component of the leakage magnetic field 640b and the Y-direction component of the leakage magnetic field 740b cancel each other.

In addition, the inductor 600b and the transformer 700b are connected in series to each other. Thus, the same current flows in the winding portion 630b and the winding portion 730b. As a result, even if the current that flows in the winding portion 630b fluctuates for some reason and the leakage magnetic field 640b fluctuates, the current that flows in the winding portion 730b also fluctuates accordingly and the leakage magnetic field 740b also fluctuates. Consequently, the Y-direction component of the leakage magnetic field 640b having reached the light receiving surface 301 and the Y-direction component of the leakage magnetic field 740b having reached the light receiving surface 301 cancel each other.

Furthermore, the resultant magnetic field of the Y-direction component of the leakage magnetic field 640a and the Y-direction component of the leakage magnetic field 740a on the light receiving surface 301 becomes opposite in direction to the resultant magnetic field of the Y-direction component of the leakage magnetic field 640b and the Y-direction component of the leakage magnetic field 740b on the light receiving surface 301. As a result, the resultant magnetic field of the Y-direction component of the leakage magnetic field 640a and the Y-direction component of the leakage magnetic field 740a on the light receiving surface 301 and the resultant magnetic field of the Y-direction component of the leakage magnetic field 640b and the Y-direction component of the leakage magnetic field 740b on the light receiving surface 301 cancel each other.

As described above, the leakage magnetic field from the inductor 600a and the leakage magnetic field from the transformer 700a, caused by the A-phase driving current, cancel with each other on the image sensor 300; and the leakage magnetic field from the inductor 600b and the leakage magnetic field from the transformer 700b, caused by the B-phase driving current, cancel with each other on the image sensor 300. Furthermore, the resultant leakage magnetic field caused by the A-phase driving current and the resultant leakage magnetic field caused by the B-phase driving current cancel with each other. By the above-described effects, the magnetic field noise that reaches the image sensor 300 is reduced, and the quality of images produced by the image sensor 300 is increased.

The difference in phase between the A-phase driving current IA and the B-phase driving current IB is in a range equal to or larger than −90 degrees and equal to or smaller than 90 degrees. Assume that the magnetic field value (measured on the light receiving surface 301) of the leakage magnetic field 740a from the transformer 700a is denoted by Ba, and that the magnetic field value (measured on the light receiving surface 301) of the leakage magnetic field 740b from the transformer 700b is denoted by Bb. If the terminal 701a of the transformer 700a and the terminal 701b of the transformer 700b are mounted in the same direction with respect to the image sensor 300, the maximum resultant magnetic field Bab is calculated as follows: Bab=Ba+Bb.

However, the terminal 701a of the transformer 700a and the terminal 701b of the transformer 700b are mounted opposite in direction to each other with respect to the image sensor 300. In this case, the maximum resultant magnetic field Bab is |Ba−Bb| if the difference in phase between the A-phase driving current IA and the B-phase driving current IB is 0 degrees, and is expressed by the following equation (1) if the difference in phase is ±90 degrees.

[Equation 1]

$$Bab=\sqrt{Ba^2+Bb^2} \qquad (1)$$

Thus, the magnetic field on the light receiving surface 301 is reduced more in a case where the terminal 701a of the transformer 700a and the terminal 701b of the transformer 700b are mounted opposite in direction to each other with respect to the image sensor 300, than in a case where the terminal 701a of the transformer 700a and the terminal 701b of the transformer 700b are mounted in the same direction.

Figure 10:
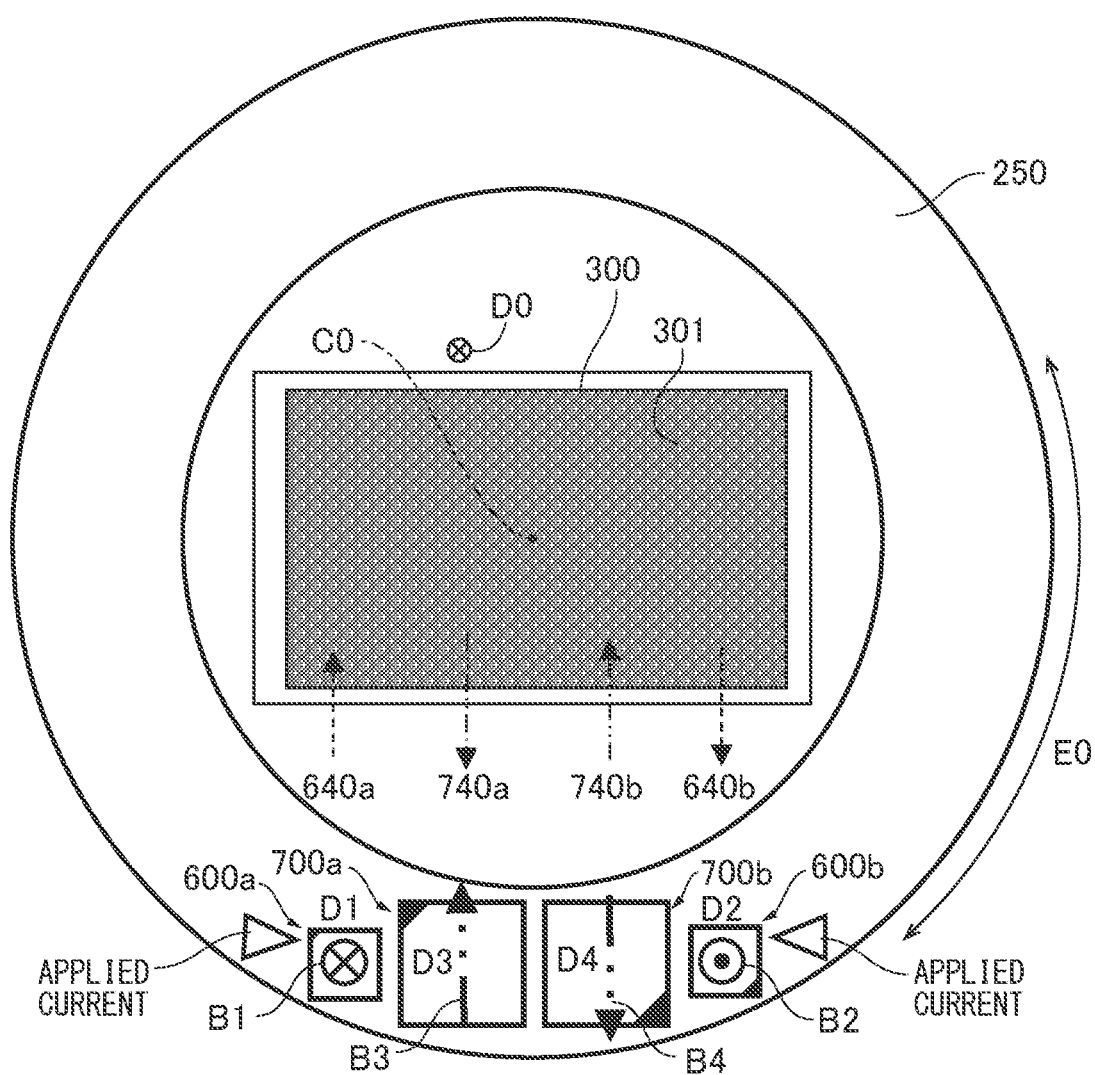
FIG. 10 is a component top-surface view illustrating directions in which the magnetic flux leaks from inductors and transformers of an embodiment.

FIG. 10 is a component top-surface view illustrating directions of magnetic flux that leaks from the inductors 600a and 600b and the transformers 700a and 700b of an embodiment. Note that the leakage magnetic field generated from each of the transformers 700a and 700b is more intense than the leakage magnetic field generated from each of the inductors 600a and 600b. Preferably, when viewed in the direction D0, the inductor 600a, the transformer 700a, the transformer 700b, and the inductor 600b are disposed in this order in the circumferential direction E0. That is, when viewed in the direction D0, the transformer 700a and the transformer 700b are preferably disposed adjacent to each other in the circumferential direction E0. In the present embodiment, since the leakage magnetic field 740a and the leakage magnetic field 740b are close to each other, the leakage magnetic field 740a and the leakage magnetic field 740b more effectively cancel each other on the light receiving surface 301 of the image sensor 300, so that the quality of images is further increased.

In addition, it is preferable that the axis around which the primary winding 711a is wound and the axis around which the primary winding 711b is wound, that is, the central axis passing through the center of the primary winding 711a and the central axis passing through the center of the primary winding 711b each intersect an axis that extends in parallel with the optical axis C0 and intersects the light receiving surface 301 of the image sensor 300. In other words, when viewed in the direction D0, it is preferable that the axis around which the primary winding 711a is wound and the axis around which the primary winding 711b is wound each intersect the image sensor 300, that is, the lens 212. The reason is as follows. The driving module 500 including the transformers 700a and 700b is separated from the image sensor 300 by the distance L2. Thus, if each of the axis around which the primary winding 711a of the transformer 700a is wound and the axis around which the primary winding 711b of the transformer 700b is wound does not intersect the lens 212 when viewed in the direction D0, the leakage magnetic field 740a intersects the leakage magnetic field 640a on the light receiving surface 301 and the leakage magnetic field 740b intersects the leakage magnetic field 640b on the light receiving surface 301. As a result, the effect for canceling the magnetic field is reduced.

Note that the wiring pattern 550, the inductor 600a, the inductor 600b, the transformer 700a, and the transformer 700b may be positioned at any position on the printed wiring board 250 in the circumferential direction E0, as long as the position of one component (i.e., one of the wiring pattern 550, the inductor 600a, the inductor 600b, the transformer 700a, and the transformer 700b) relative to the other components viewed from the optical axis C0 is the same as that illustrated in FIG. 10.

EXAMPLES

Hereinafter, experimental results obtained in Example 1 and Comparative Examples 1 to 3 will be described. Example 1 corresponds to the above-described embodiment. In Comparative Examples 1 to 3, the same mounted components as those of Example 1, that is, the inductors 600a and 600b and the transformers 700a and 700b were used. Thus, the mounted components and the wiring pattern will be described with reference to FIG. 7.

In Example 1 and Comparative Examples 1 to 3, the terminal 701a is joined with the pad 512a, the terminal 702a is joined with the pad 513a, the terminal 701b is joined with the pad 512b, and the terminal 702b is joined with the pad 513b. In this manner, the arrangement of the two transformers 700a and 700b was fixed. Thus, the inductors 600a and 600b can be disposed on both sides of the transformers 700a and 700b in four patterns. Of the four patterns, one was used in Example 1, and the others were used in Comparative Examples 1 to 3.

Figure 11:
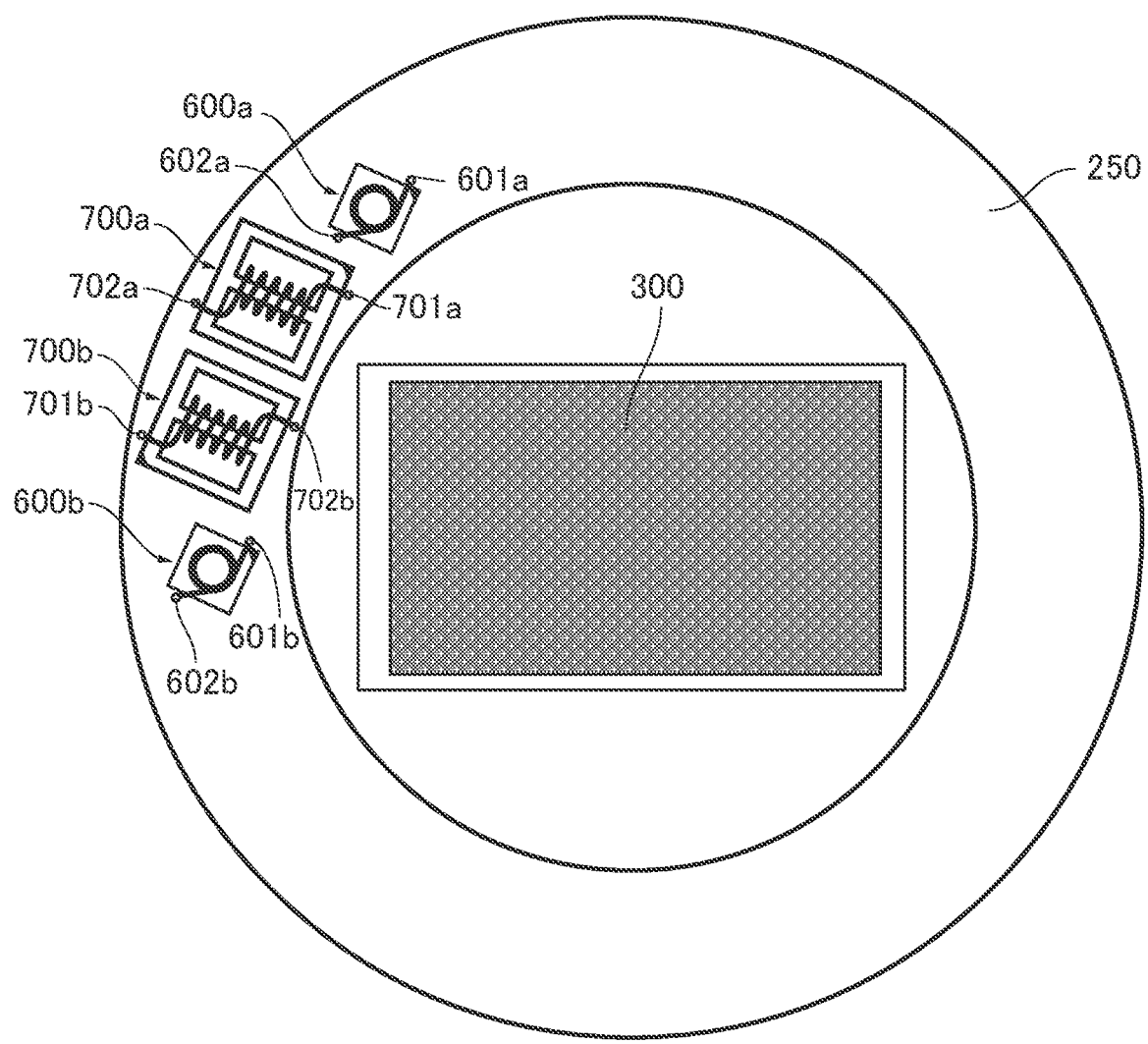
FIG. 11 is a schematic diagram illustrating arrangement of components of Comparative Example 1.
Figure 11:
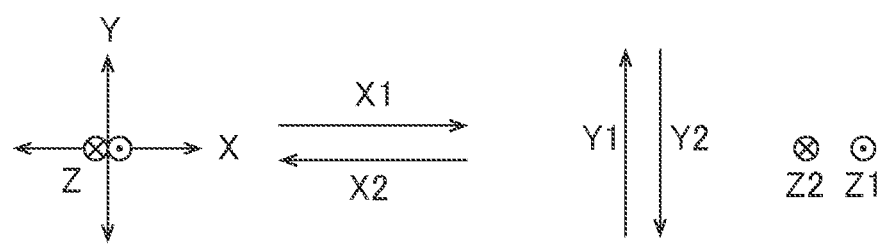

FIG. 11 is a schematic diagram illustrating arrangement of components of Comparative Example 1. In Comparative Example 1, the terminal 601a is joined with the pad 510a, the terminal 602a is joined with the pad 511a, the terminal 601b is joined with the pad 510b, and the terminal 602b is joined with the pad 511b.

That is, for the A-phase driving current, the terminal A10 of the driving circuit 30 and the terminal 601a of the inductor 600a are electrically connected to each other via a trace (not illustrated). In addition, the terminal 602a of the inductor 600a and the terminal 701a of the transformer 700a are electrically connected to each other via a trace (not illustrated). In addition, the terminal 702a of the transformer 700a and the terminal A20 of the driving circuit 30 are electrically connected to each other via a trace (not illustrated).

For the B-phase driving current, the terminal B10 of the driving circuit 30 and the terminal 601b of the inductor 600b are electrically connected to each other via a trace (not illustrated). In addition, the terminal 602b of the inductor 600b and the terminal 701b of the transformer 700b are electrically connected to each other via a trace (not illustrated). In addition, the terminal 702b of the transformer 700b and the terminal B20 of the driving circuit 30 are electrically connected to each other via a trace (not illustrated).

Figure 12:
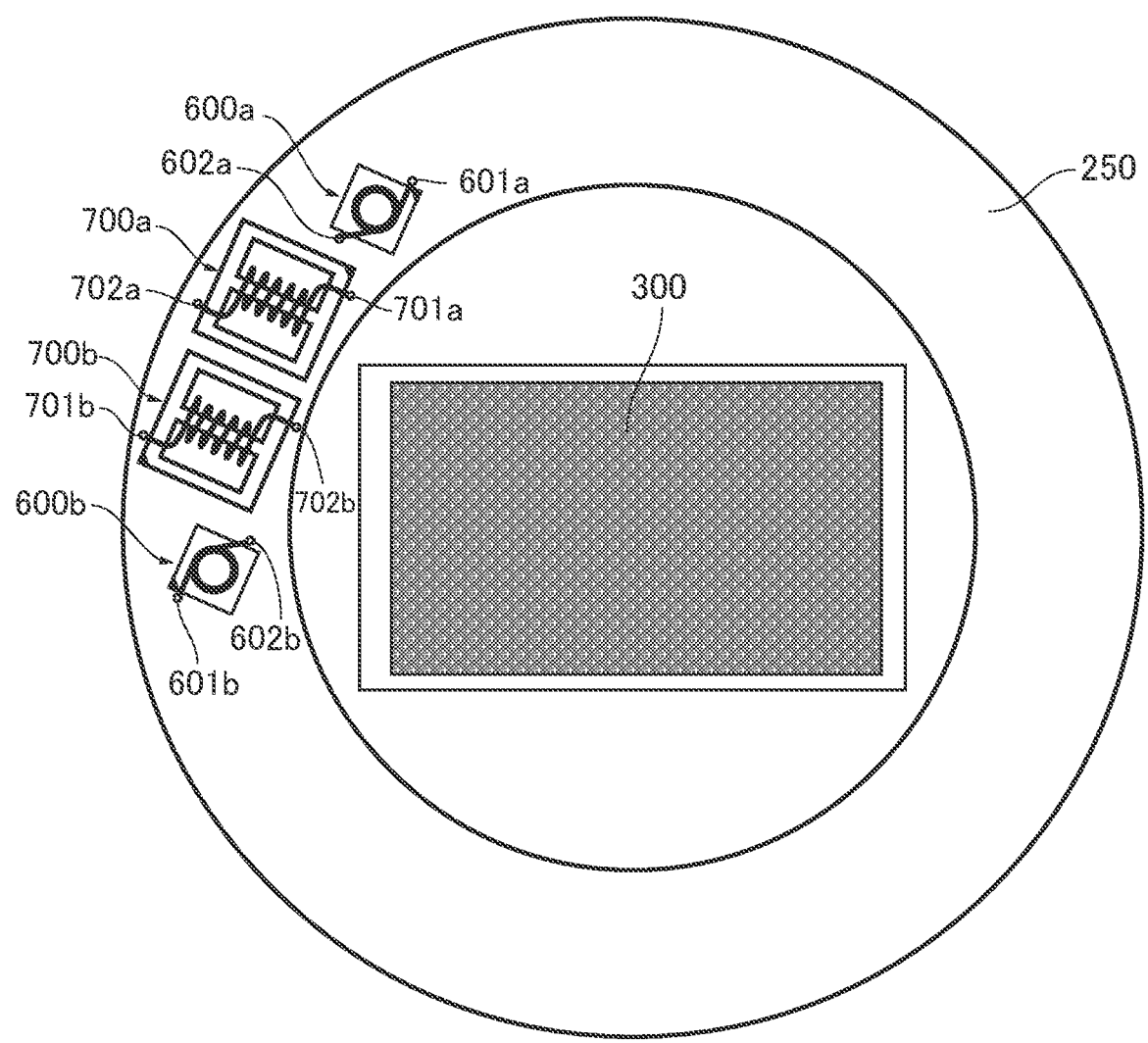
FIG. 12 is a schematic diagram illustrating arrangement of components of Example 1.
Figure 12:
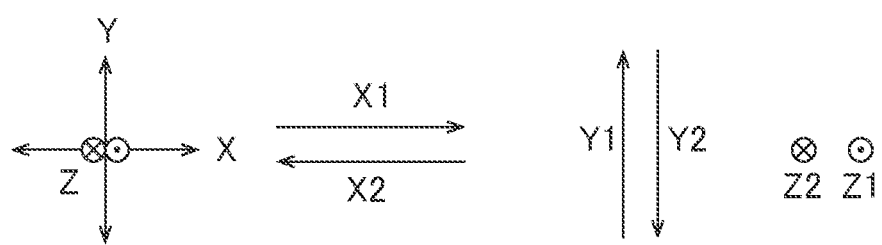

FIG. 12 is a schematic diagram illustrating arrangement of components of Example 1. In Example 1, the terminal 601a is joined with the pad 510a, the terminal 602a is joined with the pad 511a, the terminal 602b is joined with the pad 510b, and the terminal 601b is joined with the pad 511b.

That is, for the A-phase driving current, the terminal A10 of the driving circuit 30 and the terminal 601a of the inductor 600a are electrically connected to each other via a trace (not illustrated). In addition, the terminal 602a of the inductor 600a and the terminal 701a of the transformer 700a are electrically connected to each other via a trace (not illustrated). In addition, the terminal 702a of the transformer 700a and the terminal A20 of the driving circuit 30 are electrically connected to each other via a trace (not illustrated).

For the B-phase driving current, the terminal B10 of the driving circuit 30 and the terminal 602b of the inductor 600b are electrically connected to each other via a trace (not illustrated). In addition, the terminal 601b of the inductor 600b and the terminal 701b of the transformer 700b are electrically connected to each other via a trace (not illustrated). In addition, the terminal 702b of the transformer 700b and the terminal B20 of the driving circuit 30 are electrically connected to each other via a trace (not illustrated).

Figure 13:
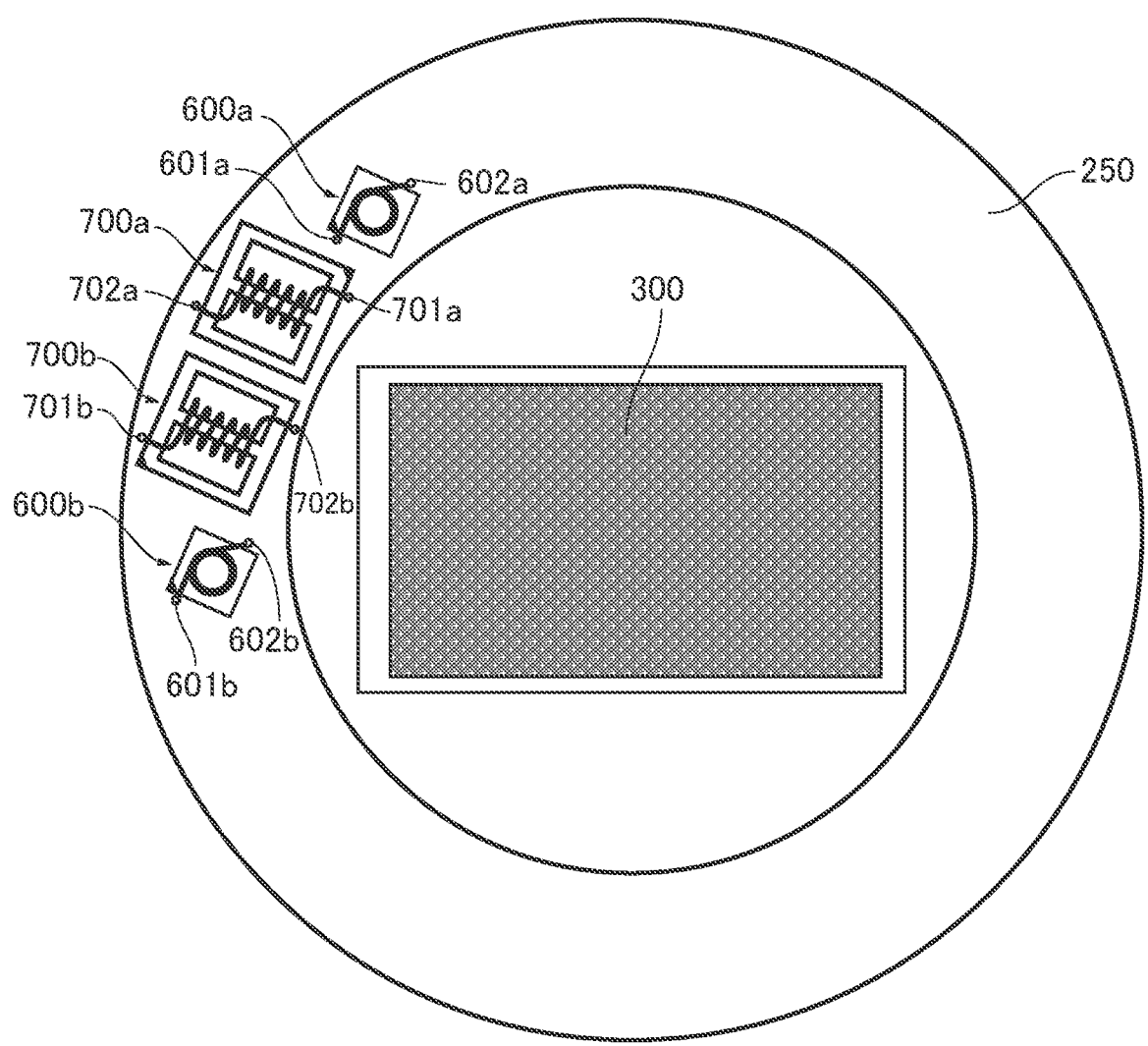
FIG. 13 is a schematic diagram illustrating arrangement of components of Comparative Example 2.
Figure 13:
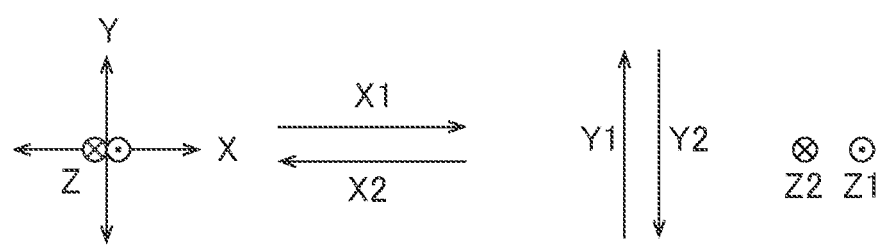

FIG. 13 is a schematic diagram illustrating arrangement of components of Comparative Example 2. In Comparative Example 2, the terminal 601a is joined with the pad 511a, the terminal 602a is joined with the pad 510a, the terminal 601b is joined with the pad 511b, and the terminal 602b is joined with the pad 510b.

That is, for the A-phase driving current, the terminal A10 of the driving circuit 30 and the terminal 602a of the inductor 600a are electrically connected to each other via a trace (not illustrated). In addition, the terminal 601a of the inductor 600a and the terminal 701a of the transformer 700a are electrically connected to each other via a trace (not illustrated). In addition, the terminal 702a of the transformer 700a and the terminal A20 of the driving circuit 30 are electrically connected to each other via a trace (not illustrated).

For the B-phase driving current, the terminal B10 of the driving circuit 30 and the terminal 602b of the inductor 600b are electrically connected to each other via a trace (not illustrated). In addition, the terminal 601b of the inductor 600b and the terminal 701b of the transformer 700b are electrically connected to each other via a trace (not illustrated). In addition, the terminal 702b of the transformer 700b and the terminal B20 of the driving circuit 30 are electrically connected to each other via a trace (not illustrated).

Figure 14:
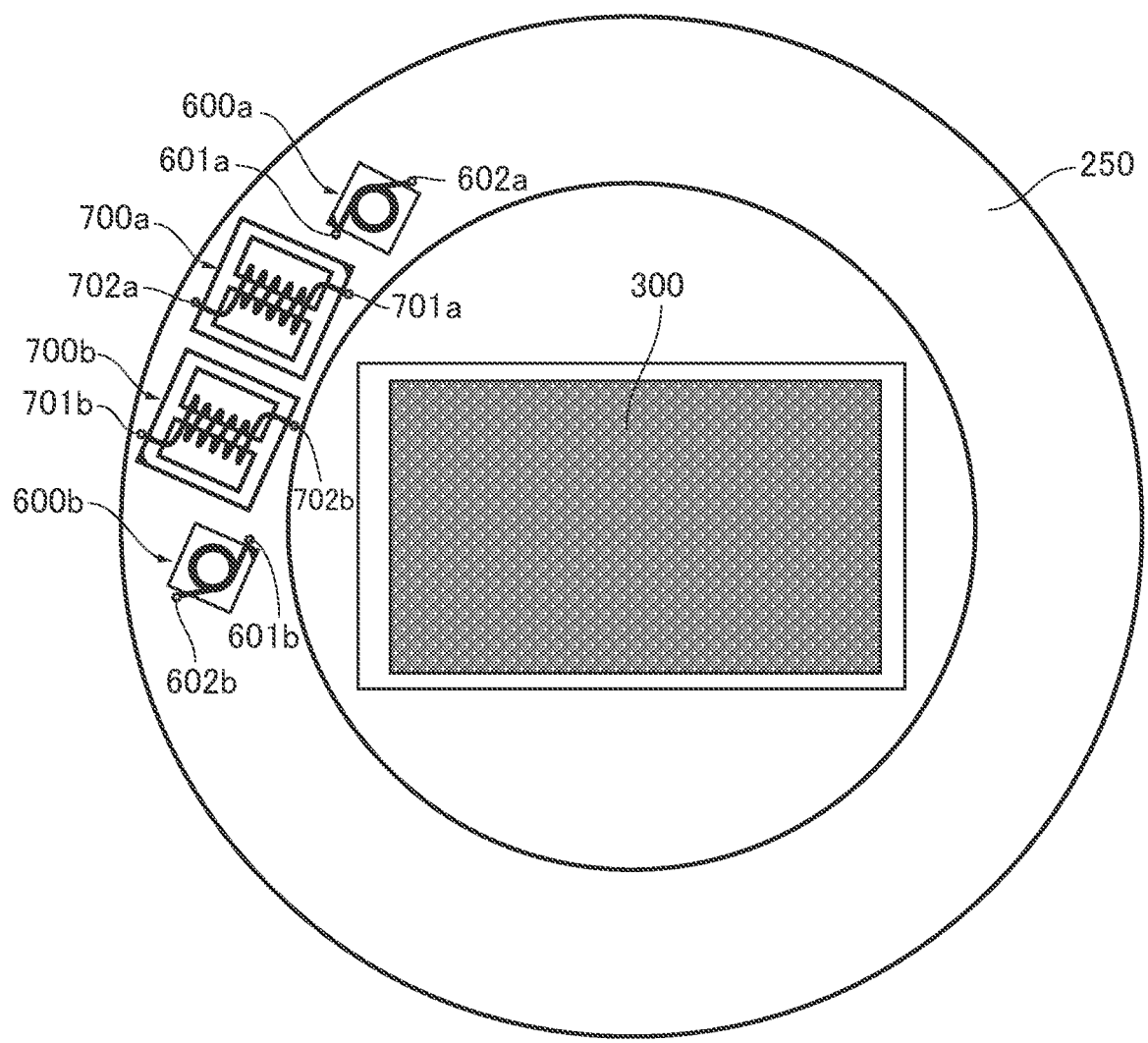
FIG. 14 is a schematic diagram illustrating arrangement of components of Comparative Example 3.
Figure 14:
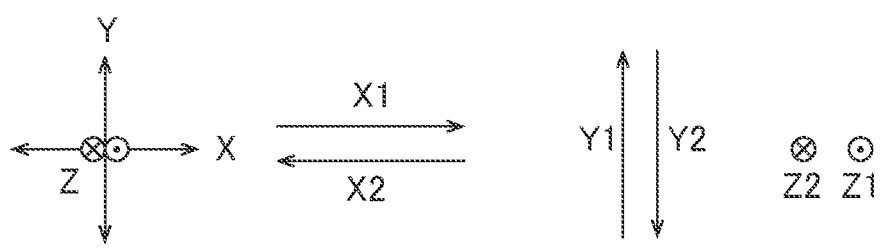

FIG. 14 is a schematic diagram illustrating arrangement of components of Comparative Example 3. In Comparative Example 3, the terminal 601a is joined with the pad 511a, the terminal 602a is joined with the pad 510a, the terminal 601b is joined with the pad 510b, and the terminal 602b is joined with the pad 511b.

That is, for the A-phase driving current, the terminal A10 of the driving circuit 30 and the terminal 602a of the inductor 600a are electrically connected to each other via a trace (not illustrated). In addition, the terminal 601a of the inductor 600a and the terminal 701a of the transformer 700a are electrically connected to each other via a trace (not illustrated). In addition, the terminal 702a of the transformer 700a and the terminal A20 of the driving circuit 30 are electrically connected to each other via a trace (not illustrated).

For the B-phase driving current, the terminal B10 of the driving circuit 30 and the terminal 601b of the inductor 600b are electrically connected to each other via a trace (not illustrated). In addition, the terminal 602b of the inductor 600b and the terminal 701b of the transformer 700b are electrically connected to each other via a trace (not illustrated). In addition, the terminal 702b of the transformer 700b and the terminal B20 of the driving circuit 30 are electrically connected to each other via a trace (not illustrated).

The inductors 600a and 600b used were inductors, SHP0420P-F100NAP, made by Tokyo Coil Engineering Co., Ltd. The transformers 700a and 700b used were transformers, TTRN-038S-081-T, made by Tokyo Coil Engineering Co., Ltd. In addition, a rectangular voltage with a duty ratio of 50% was applied for generating each of the A-phase driving voltage and the B-phase driving voltage. The voltage was adjusted so that the current that flows in the primary winding of the transformer 700a had an effective value of 130 mA, and that the current that flows in the primary winding of the transformer 700b had an effective value of 130 mA. In addition, a capacitor of 470 pF and a resistor of 47 kΩ were connected in parallel to the secondary winding of each of the transformers 700a and 700b, instead of the driving motor.

Figure 15:
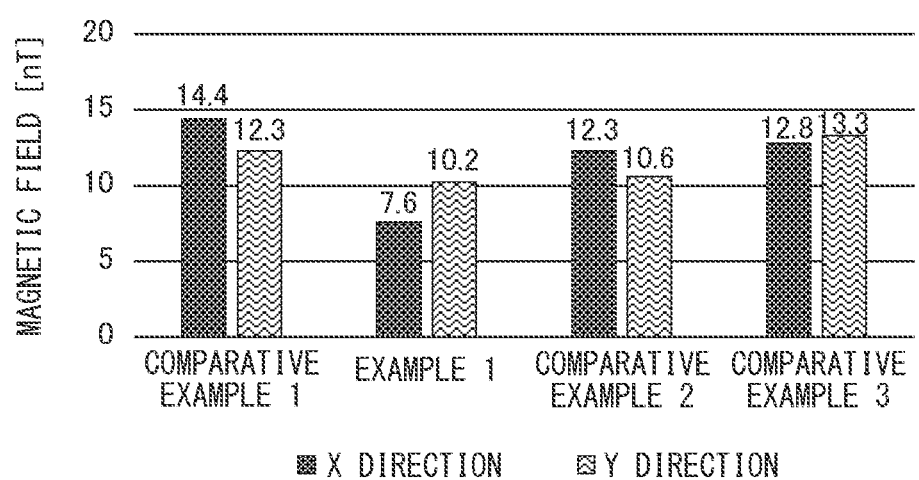
FIG. 15 is a graph illustrating experimental results obtained in Example 1 and Comparative Examples 1 to 3.

FIG. 15 is a graph illustrating experimental results obtained in Example 1 and Comparative Examples 1 to 3. FIG. 15 illustrates the maximum value of magnetic field that reached the light receiving surface 301 in the X direction parallel with the light receiving surface 301, and the maximum value of magnetic field that reached the light receiving surface 301 in the Y direction parallel with the light receiving surface 301. Specifically, the difference in phase between the A-phase driving current and the B-phase driving current was set at 0 degrees, and the maximum value of magnetic field in the X direction was measured. Then, the difference in phase between the A-phase driving current and the B-phase driving current was set at 90 degrees, and the maximum value of magnetic field in the X direction was measured. Of the two maximum values of magnetic field, a larger one was determined as the maximum value of magnetic field in the X direction, and is illustrated in the graph of FIG. 15. In addition, the difference in phase between the A-phase driving current and the B-phase driving current was set at 0 degrees, and the maximum value of magnetic field in the Y direction was measured. Then, the difference in phase between the A-phase driving current and the B-phase driving current was set at 90 degrees, and the maximum value of magnetic field in the Y direction was measured. Of the two maximum values of magnetic field, a larger one was determined as the maximum value of magnetic field in the Y direction, and is illustrated in the graph of FIG. 15.

From the experimental results illustrated in FIG. 15, it can be seen that in Example 1, the maximum value of magnetic field that reached the light receiving surface 301 was decreased in each of the X direction and the Y direction, from those of Comparative Examples 1 to 3.

Modifications

FIGS. 16A to 16C, and 17A to 17D are schematic diagrams illustrating arrangement of components of Modifications 1 to 7. As described in Modifications 1 to 7 illustrated in FIGS. 16A to 16C, and 17A to 17D, the arrangement of the inductors 600a and 600b and the transformers 700a and 700b in the circumferential direction may be changed from the arrangement of the embodiment illustrated in FIG. 6, with the connection of the inductors 600a and 600b and the transformers 700a and 700b being the same as that of the embodiment.

Figure 16A:
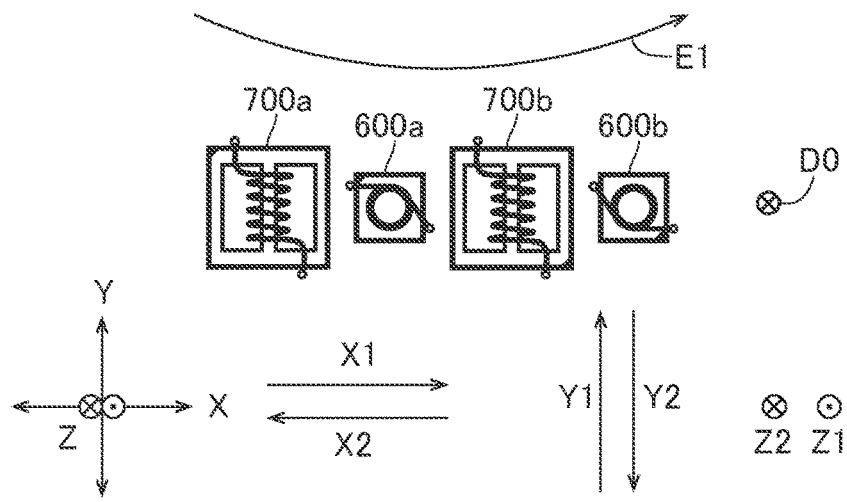
FIG. 16A is a schematic diagram illustrating arrangement of components of Modification 1.

In Modification 1 illustrated in FIG. 16A, when viewed in the direction D0, the transformer 700a, the inductor 600a, the transformer 700b, and the inductor 600b are disposed in this order in the counterclockwise direction E1.

Figure 16B:
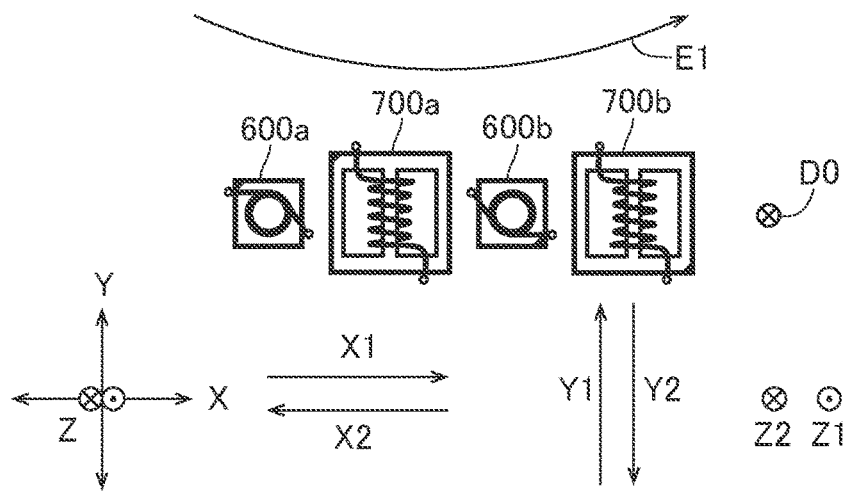
FIG. 16B is a schematic diagram illustrating arrangement of components of Modification 2.

In Modification 2 illustrated in FIG. 16B, when viewed in the direction D0, the inductor 600a, the transformer 700a, the inductor 600b, and the transformer 700b are disposed in this order in the counterclockwise direction E1.

Figure 16C:
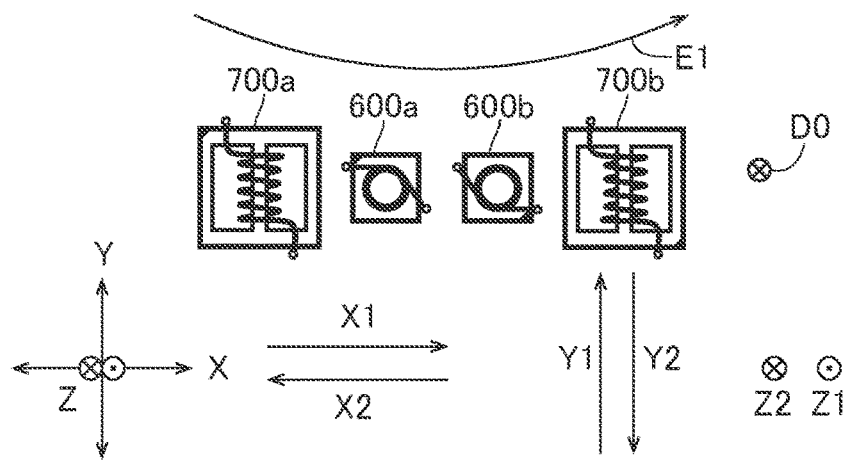
FIG. 16C is a schematic diagram illustrating arrangement of components of Modification 3.

In Modification 3 illustrated in FIG. 16C, when viewed in the direction D0, the transformer 700a, the inductor 600a, the inductor 600b, and the transformer 700b are disposed in this order in the counterclockwise direction E1.

Figure 17A:
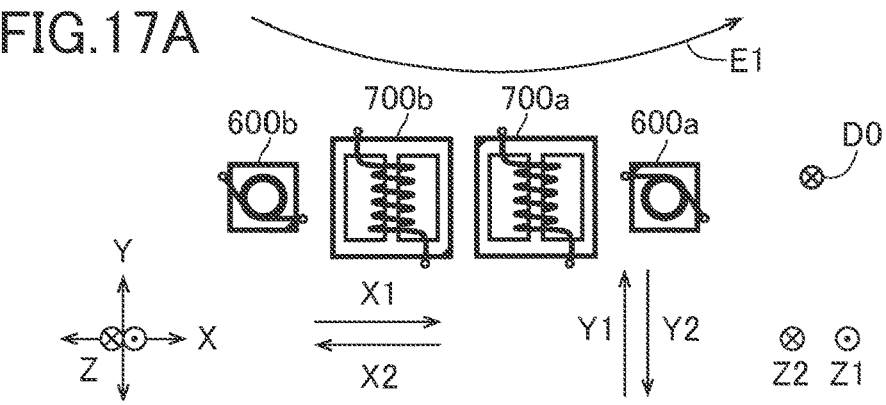
FIG. 17A is a schematic diagram illustrating arrangement of components of Modification 4.

In Modification 4 illustrated in FIG. 17A, when viewed in the direction D0, the inductor 600b, the transformer 700b, the transformer 700a, and the inductor 600a are disposed in this order in the counterclockwise direction E1.

Figure 17B:
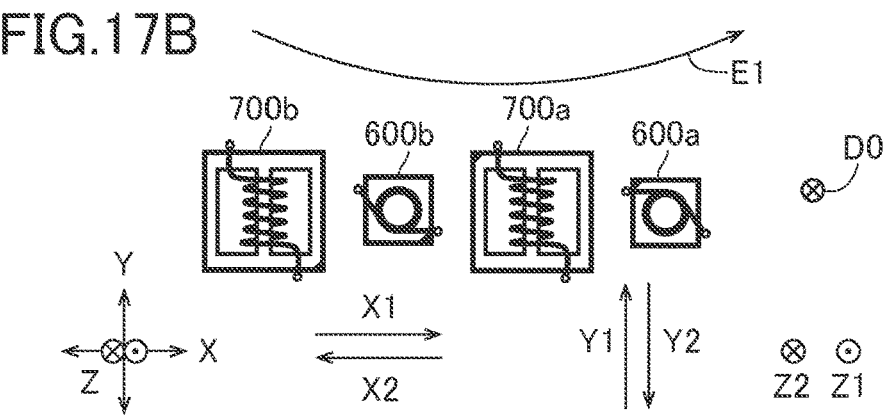
FIG. 17B is a schematic diagram illustrating arrangement of components of Modification 5.

In Modification 5 illustrated in FIG. 17B, when viewed in the direction D0, the transformer 700b, the inductor 600b, the transformer 700a, and the inductor 600a are disposed in this order in the counterclockwise direction E1.

Figure 17C:
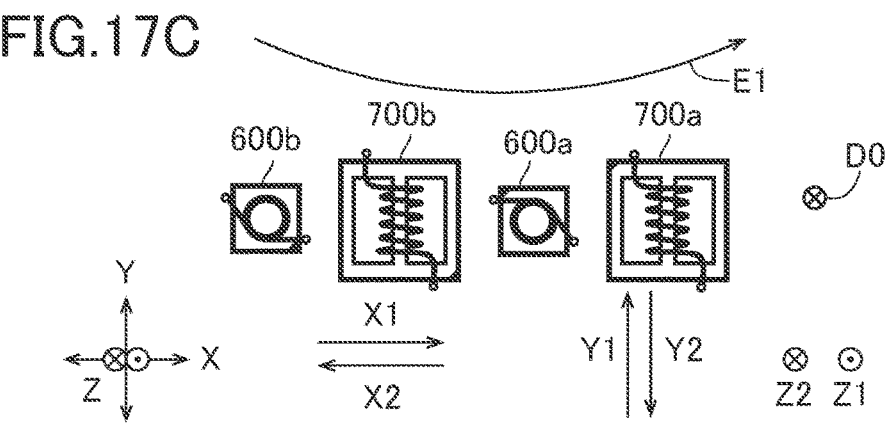
FIG. 17C is a schematic diagram illustrating arrangement of components of Modification 6.

In Modification 6 illustrated in FIG. 17C, when viewed in the direction D0, the inductor 600b, the transformer 700b, the inductor 600a, and the transformer 700a are disposed in this order in the counterclockwise direction E1.

Figure 17D:
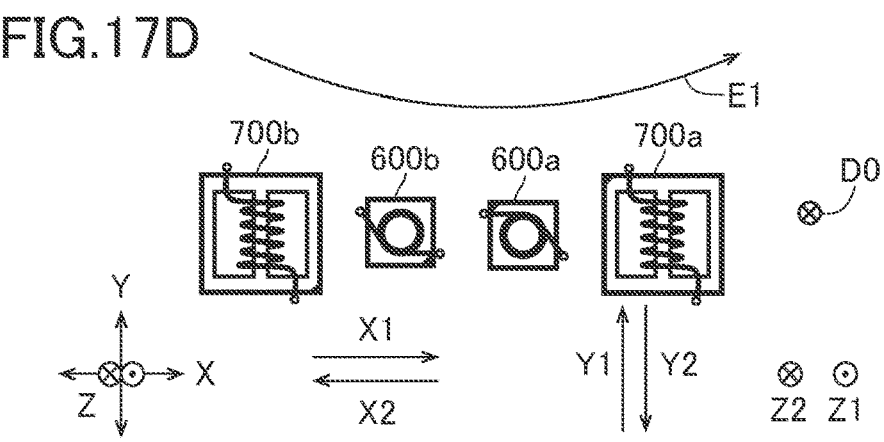
FIG. 17D is a schematic diagram illustrating arrangement of components of Modification 7.

In Modification 7 illustrated in FIG. 17D, when viewed in the direction D0, the transformer 700b, the inductor 600b, the inductor 600a, and the transformer 700a are disposed in this order in the counterclockwise direction E1.

The present invention is not limited to the above-described embodiment, and can be modified within a technical concept of the present invention. In addition, the effects described in the embodiment are merely examples of the most suitable effects produced by the present invention. Thus, the effects of the present invention are not limited to the effects described in the embodiment.

In the above-described embodiment, the description has been made for the case where the lens barrel 200 is detachably attached to the camera body 100. The present disclosure, however, is not limited to this. The present invention can also be applied for a digital camera in which the lens and the driving module are disposed in the camera body.

In addition, in the above-described embodiment, the description has been made for the case where the electric module is the driving module 500 that drives the driving motor 50. The present disclosure, however, is not limited to this. The present invention can also be applied for any image pickup apparatus as long as the image pickup apparatus includes an electric module that supplies electric power to a load.

In addition, in the above-described embodiment, the description has been made for the case where the image pickup apparatus is a digital camera. The present disclosure, however, is not limited to this. The present invention can also be applied for image pickup apparatuses such as mobile communication devices, including smartphones, tablet PCs, and game machines, and wearable devices.

The present disclosure improves the quality of images.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-86741, filed May 24, 2021, and Japanese Patent Application No. 2022-67588, filed Apr. 15, 2022, which are hereby incorporated by reference herein in their entirety.

What is claimed is:

1. An image pickup apparatus comprising:
an image sensor;
a lens; and
an electric module disposed outside the lens when viewed in a first direction extending along an optical axis of the lens,
wherein the electric module includes
a first inductor including a first terminal and a second terminal,
a first transformer including a first primary winding including a third terminal and a fourth terminal,
a second inductor including a fifth terminal and a sixth terminal, and
a second transformer including a second primary winding including a seventh terminal and an eighth terminal,
wherein the second terminal of the first inductor is connected to the third terminal of the first primary winding,
wherein the fifth terminal of the second inductor is connected to the seventh terminal of the second primary winding,
wherein when viewed in the first direction, the first inductor is wound clockwise from the first terminal toward the second terminal,
wherein when viewed in the first direction, the second inductor is wound counterclockwise from the sixth terminal toward the fifth terminal,
wherein when the first primary winding is viewed from a first axis that extends in parallel with the optical axis and intersects the lens, the first primary winding is wound counterclockwise from the third terminal toward the fourth terminal, and
wherein when the second primary winding is viewed from a second axis that extends in parallel with the optical axis and intersects the lens, the second primary winding is wound clockwise from the seventh terminal toward the eighth terminal.

2. The image pickup apparatus according to claim 1, wherein when viewed in the first direction, the first inductor is disposed adjacent to the first transformer in a circumferential direction of the lens, and the second inductor is disposed adjacent to the second transformer in the circumferential direction.

3. The image pickup apparatus according to claim 2, wherein when viewed in the first direction, the first inductor, the first transformer, the second transformer, and the second inductor are disposed in this order in the circumferential direction.

4. The image pickup apparatus according to claim 1, wherein inside the first inductor, a first magnetic flux is generated by current supplied to the first inductor, in a second direction parallel with the first direction, and
wherein inside the second inductor, a second magnetic flux is generated by current supplied to the second inductor, in a third direction opposite to the second direction.

5. The image pickup apparatus according to claim 1, wherein inside the first primary winding, a third magnetic flux is generated by current supplied to the first primary winding, in a fourth direction perpendicular to the first direction, and
wherein inside the second primary winding, a fourth magnetic flux is generated by current supplied to the second primary winding, in a fifth direction opposite to the fourth direction.

6. The image pickup apparatus according to claim 1, wherein the electric module includes a circuit configured to supply a first alternating current to the first inductor and the first primary winding, and
supply a second alternating current to the second inductor and the second primary winding.

7. The image pickup apparatus according to claim 6, wherein a difference in phase between the first alternating current and the second alternating current is equal to or larger than $-90$ degrees and equal to or smaller than 90 degrees.

8. The image pickup apparatus according to claim 1, wherein a distance between the first transformer and the second transformer is smaller than a distance between the electric module and the image sensor.

9. The image pickup apparatus according to claim 1, wherein the electric module includes a wiring board on which the first inductor, the second inductor, the first transformer, and the second transformer are mounted.

10. The image pickup apparatus according to claim 9, wherein the first inductor, the second inductor, the first transformer, and the second transformer are mounted on a first main surface of the wiring board.

11. The image pickup apparatus according to claim 1, further comprising a driving motor configured to drive the lens,
wherein the electric module is configured to supply electric power to the driving motor.

12. The image pickup apparatus according to claim 1, wherein the first transformer includes a first secondary winding configured to output a voltage to which a voltage applied across the first primary winding is boosted, and
wherein the second transformer includes a second secondary winding configured to output a voltage to which a voltage applied across the second primary winding is boosted.

13. The image pickup apparatus according to claim 1, wherein the image sensor is disposed inside a housing of an image-pickup-apparatus body, and
wherein the electric module and the lens are disposed inside a housing of a lens barrel configured to be detachably attached to the image-pickup-apparatus body.

14. An image pickup apparatus comprising:
an image-pickup-apparatus body; and a lens barrel configured to be detachably attached to the image-pickup-apparatus body,
wherein the lens barrel includes
a lens, and
an electric module disposed outside the lens when viewed in a first direction extending along an optical axis of the lens,
wherein the electric module includes
a first inductor including a first terminal and a second terminal,
a first transformer including a first primary winding including a third terminal and a fourth terminal,
a second inductor including a fifth terminal and a sixth terminal, and
a second transformer including a second primary winding including a seventh terminal and an eighth terminal,
wherein the second terminal of the first inductor is connected to the third terminal of the first primary winding,
wherein the fifth terminal of the second inductor is connected to the seventh terminal of the second primary winding,
wherein when viewed in the first direction, the first inductor is wound clockwise from the first terminal toward the second terminal,
wherein when viewed in the first direction, the second inductor is wound counterclockwise from the sixth terminal toward the fifth terminal,
wherein when the first primary winding is viewed from a first axis that extends in parallel with the optical axis and intersects the lens, the first primary winding is wound counterclockwise from the third terminal toward the fourth terminal, and
wherein when the second primary winding is viewed from a second axis that extends in parallel with the optical axis and intersects the lens, the second primary winding is wound clockwise from the seventh terminal toward the eighth terminal.

15. A lens barrel configured to be detachably attached to an image-pickup-apparatus body, the lens barrel comprising:
a lens; and
an electric module disposed outside the lens when viewed in a first direction extending along an optical axis of the lens,
wherein the electric module includes
a first inductor including a first terminal and a second terminal,
a first transformer including a first primary winding including a third terminal and a fourth terminal,
a second inductor including a fifth terminal and a sixth terminal, and
a second transformer including a second primary winding including a seventh terminal and an eighth terminal,
wherein the second terminal of the first inductor is connected to the third terminal of the first primary winding,
wherein the fifth terminal of the second inductor is connected to the seventh terminal of the second primary winding,
wherein when viewed in the first direction, the first inductor is wound clockwise from the first terminal toward the second terminal,
wherein when viewed in the first direction, the second inductor is wound counterclockwise from the sixth terminal toward the fifth terminal,
wherein when the first primary winding is viewed from a first axis that extends in parallel with the optical axis and intersects the lens, the first primary winding is wound counterclockwise from the third terminal toward the fourth terminal, and
wherein when the second primary winding is viewed from a second axis that extends in parallel with the optical axis and intersects the lens, the second primary winding is wound clockwise from the seventh terminal toward the eighth terminal.

* * * * *